US006956901B2

United States Patent
Boroczky et al.

(10) Patent No.: US 6,956,901 B2
(45) Date of Patent: Oct. 18, 2005

(54) CONTROL STRATEGY FOR DYNAMICALLY ENCODING MULTIPLE STREAMS OF VIDEO DATA IN PARALLEL FOR MULTIPLEXING ONTO A CONSTANT BIT RATE CHANNEL

(75) Inventors: Lilla Boroczky, Endicott, NY (US); Agnes Y. Ngai, Endwell, NY (US); Edward F. Westermann, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 10/834,643

(22) Filed: Apr. 29, 2004

(65) Prior Publication Data

US 2004/0202248 A1 Oct. 14, 2004

Related U.S. Application Data

(63) Continuation of application No. 09/087,603, filed on May 29, 1998, now abandoned.

(51) Int. Cl.[7] ............................................. H04N 7/12
(52) U.S. Cl. .......... 375/240.03; 375/240; 375/240.01; 375/240.02; 375/240.12
(58) Field of Search ........................ 375/240.03, 240, 375/240.01, 240.02, 240.12; 348/700

(56) References Cited

U.S. PATENT DOCUMENTS

| 5,533,021 | A | 7/1996 | Branstad et al. ............. 370/60.1 |
| 5,537,408 | A | 7/1996 | Branstad et al. ............... 370/70 |
| 5,565,920 | A | 10/1996 | Lee et al. ..................... 348/398 |
| 5,598,213 | A | 1/1997 | Chung et al. ................. 348/405 |
| 5,619,337 | A | 4/1997 | Naimpally .................... 386/83 |
| 5,650,860 | A | 7/1997 | Uz ............................ 358/430 |
| 5,699,119 | A | 12/1997 | Chung et al. ................. 348/405 |
| 5,793,425 | A | 8/1998 | Balakrishnan .............. 348/387 |
| 5,861,919 | A | 1/1999 | Perkins et al. ............. 348/385 |
| 6,038,256 | A | 3/2000 | Linzer et al. ............... 375/240 |
| 6,040,861 | A | 3/2000 | Boroczky et al. ............ 348/409 |
| 6,148,029 | A | * 11/2000 | Fert ....................... 375/240.03 |
| 6,195,388 | B1 | 2/2001 | Choi et al. ............. 375/240.05 |

FOREIGN PATENT DOCUMENTS

| JP | 06-062393 | 3/1994 |
| JP | 06-268985 | 9/1994 |
| JP | 07-184192 | 7/1995 |
| JP | 07-264580 | 10/1995 |
| JP | 08-098185 | 4/1996 |
| JP | 09-051538 | 2/1997 |
| JP | 09-116520 | 5/1997 |
| JP | 09-252290 | 9/1997 |
| WO | WO99-01987 | 1/1997 |

OTHER PUBLICATIONS

International Organisation for Standardisation—Coding of Moving Pictures and Associated Audio, "Information Technology—Generic Coding of Moving Pictures", Recommendation H.222.0, Nov. 13, 1994, ISO/IEC 13818–1, pp. 15.

(Continued)

Primary Examiner—Allen Wong
(74) Attorney, Agent, or Firm—William H. Steinberg, Esq.; Kevin P. Radigan, Esq.; Heslin Rothenberg Farley & Mesiti, P.C.

(57) ABSTRACT

A control strategy is provided for dynamically encoding multiple streams of video data in parallel for multiplexing onto a constant bit rate channel. The control strategy is a single pass strategy which allows individual encode bit rates to be dynamically adjusted for each video data stream based on part in relative complexity of the multiple streams of video data, as well as fullness of compressed video data buffers and a channel buffer coupled between the encoders and the constant bit rate channel. The control strategy includes encoding the multiple streams of video frames in parallel, and dynamically adapting encoding of at least one stream of the video frames based on relative complexity of the video frames. The bit rate for each stream of video frames is only changed at GOP boundaries, or if a scene change occurs. The calculated bit rate is preferably further modified based upon buffer fullness.

44 Claims, 12 Drawing Sheets

OTHER PUBLICATIONS

Gertjan Keesman, "Multi-Program Video Compression Using Joint Bit-Rate Control", Philips Journal of Research, vol. 50, No. 1/2, 1996, pp. 21–45.

D. Arnstein, et al., "Statistical Multiplexing of Multiple MPEG-2 Video Programs in a Single Channel", SMPTE Journal, Technical Paper, Sep. 1995, pp. 596–599.

L. Wang, et al., "Joint Rate Control for Multi-Program Video Coding", IEEE Transactions on Consumer Electronics, vol. 42, No. 3, Aug. 1996, pp. 300–305.

A. Guha, et al., "Multichannel Joint Rate Control of VBR MPEG Encoded Video For DBS Applications", IEEE Transactions on Consumer Electronics, vol. 40, No. 3, Aug. 1994, pp. 616–623.

M. Balakrishnan, et al., "Global Optimization of Multiplexed Video Encoders", IEEE International Conference on Image Processing, Oct. 26–29, 1997, pp. 377–380.

* cited by examiner

US 6,956,901 B2

CONTROL STRATEGY FOR DYNAMICALLY ENCODING MULTIPLE STREAMS OF VIDEO DATA IN PARALLEL FOR MULTIPLEXING ONTO A CONSTANT BIT RATE CHANNEL

CROSS REFERENCE TO RELATED APPLICATIONS

This application is a continuation of U.S. patent application Ser. No. 09/087,603, filed May 29, 1998 now abandoned, entitled "Control Strategy For Dynamically Encoding Multiple Streams Of Video Data In Parallel For Multiplexing Onto A Constant Bit Rate Channel", the entirety of which is hereby incorporated herein by reference.

In addition, this application contains subject matter which is related to the subject matter of the following application, which is assigned to the same assignee as this application and which is hereby incorporated herein by reference in its entirety:

"Adaptively Encoding Multiple Streams Of Video Data In Parallel For Multiplexing Onto A Constant Bit Rate Channel", Boroczky et al., Ser. No. 09/225,193, filed Jan. 5, 1999.

TECHNICAL FIELD

This invention relates in general to compression of digital visual images, and more particularly, to a control strategy for dynamically encoding multiple streams of video data in parallel for multiplexing onto a constant bit rate channel. The control strategy comprises a single pass strategy which allows individual encode bit rates to be dynamically adjusted within each video data stream based in part on relative complexity of the multiple streams of video data.

BACKGROUND OF THE INVENTION

The emergence of various digital video technologies in industries such as broadcast television, communications networks, consumer electronics, and multimedia computers continues to increase at a remarkable rate. This widespread use of digital video applications is motivated by the fact that signal processing, editing and data transfer of digital information is much easier compared with processing of analog representations. But as importantly, digital video owes its popularity to the several standards that have been created for digital video compression in recent years.

Digital video compression solutions are arguably the most important component of any digital video platform. Since digital video is known to contain an enormous amount of information in uncompressed format, its manipulation, storage, and transmission can be very time consuming and expensive, if not impossible. As a result, digital video compression techniques have been devised to reduce the overwhelming volume of data while preserving the perceptual quality of its content. A compatible video decompression scheme is then used to uncompress the data for playback.

The MPEG-2 International Standard formed by the Moving Pictures and Expert Group, and described in ISO/IEC 13818-2, "Information Technology—Generic Coding of Moving Pictures and Associated Audio Information: Video 1996," which is hereby incorporated herein by reference in its entirety, is intended to standardize compression for the industries noted above. The ISO MPEG-2 standard specifies the syntax of the encoded bitstream and semantics of the decoding process. The choice of coding parameters and tradeoffs in performance versus complexity, however, are left to the encoder developer.

The efficiency of the MPEG-2 encoding system is assessed by the fidelity of the perceived video transmitted over a fixed communication bandwidth or stored into a digital medium. For some applications, such as digital satellite systems, multiple programs are multiplexed into a single large stream for broadcasting, and a bank of MPEG-2 encoders is used to monitor and encode all programs, while attempting to maintain the quality of the received channels. The MPEG-2 stream is sent over either a fixed communications bandwidth or a dynamic bandwidth as in asynchronous transfer mode (ATM) networks.

In typical statistical multiplexing systems, such as direct broadcast satellite (DBS) applications, several video bitstreams (or programs) are multiplexed onto one single constant bit rate channel. Unfortunately, encoding of each program at a predefined constant bit rate can lead to picture quality degradation due to changes of scene content in the programs over time. The problem becomes more complex if the operation of the encoders is not aligned in time, such as when the video sources have different coding carried out and/or different group of picture (GOP) structures.

A need thus exists in the art for a multi-program compression technique which dynamically distributes available bandwidth among programs in order to optimize overall video quality of the system. The present invention provides such a technique by employing a joint rate control strategy which guides the individual encoders dynamically during the encoding process.

SUMMARY OF THE INVENTION

Briefly described, in one aspect a method is presented in accordance with the principles of this invention for processing multiple streams of video frames. This method includes: encoding the multiple streams of video frames in parallel; and dynamically adapting encoding of at least one stream of video frames of the multiple streams of video frames based on relative complexity of video frames comprising the multiple streams of video frames. In an enhanced embodiment, the dynamically adapting of encoding includes adjusting a controllable encode parameter based on complexity of the video frames comprising the multiple streams. The adjusting preferably occurs upon detection of a scene change in the at least one stream of video frames, or upon initiation of a new group of pictures.

In another aspect, a method for processing multiple streams of video frames is presented which includes: encoding the multiple streams of video frames employing at least one controllable encode parameter for each stream of video frames; during the encoding, analyzing each stream of video frames to derive information on at least one characteristic thereof, the at least one characteristic comprising at least one of an intraframe characteristic or an interframe characteristic; and dynamically adapting the encoding of each stream of video frames using relative information on the at least one characteristic obtained from each stream of the multiple streams of video frames. The dynamically adapting includes for each stream of video frames adjusting the at least one controllable encode parameter employed in the encoding, wherein the encoding of the video frames is dynamically adaptive to relative changes in the at least one characteristic obtained from the multiple streams of video frames.

In a further aspect, a system is provided for processing multiple streams of video frames. This system includes multiple encoders for encoding the multiple streams of video frames in parallel. Each encoder is coupled to receive one stream of video frames of the multiple streams of video frames. A joint controller is connected to each encoder for dynamically adapting encoding of at least one stream of video frames of the multiple streams of video frames based on relative complexity of the video frames comprising the multiple streams of video frames.

In still another aspect, this invention comprises a system for processing multiple streams of video frames. The system includes multiple encoders for encoding the multiple streams of video frames. Each encoder employs at least one controllable encode parameter for encoding one stream of video frames. An analyzer is provided for analyzing each stream of video frames to derive information on at least one characteristic thereof. The at least one characteristic comprises at least one of an intraframe characteristic or an interframe characteristic. Means are also provided for dynamically adapting the encoding of each stream of video frames using relative information on the at least one characteristic obtained from each stream of video frames. The means for dynamically adapting encoding includes for each stream of video frames means for adjusting the at least one controllable encode parameter employed in the encoding thereof. The encoding of each stream of video frames is thus dynamically adaptive to relative changes in the at least one characteristic obtained from the multiple streams of video frames.

In a still further aspect, an article of manufacture is provided which includes at least one computer usable medium having computer readable program code means embodied therein for causing the processing of multiple streams of video frames. The computer readable program code means in the article of manufacture includes: computer readable program code means for causing a computer to encode the multiple streams of video frames; and computer readable program code means for causing a computer to dynamically adapt encoding of at least one stream of video frames of the multiple streams of video frames based on relative complexity of the video frames.

In yet another aspect, an article of manufacture is provided which includes at least one computer usable medium having computer readable program code means embodied therein for causing the processing of multiple streams of video frames. The computer readable program code means in the article of manufacture includes: computer readable program code means for causing a computer to encode the multiple streams of video frames, the encoding including employing at least one controllable encode parameter for each stream of video frames; computer readable program code means for causing a computer to analyze each stream of video frames to derive information on at least one characteristic thereof, the at least one characteristic comprising at least one of an intraframe characteristic or an interframe characteristic; and computer readable program code means for causing a computer to dynamically adapt the encoding of the stream of video frames using relative information on the at least one characteristic obtained from each stream of video frames. The dynamically adapting of encoding includes for each stream of video frames adjusting the at least one controllable encode parameter employed in the encoding thereof. Thus, the encoding of each stream of video frames is dynamically adaptive to relative changes in the at least one characteristic obtained from the multiple streams of video frames.

To restate, presented herein is a system solution for statistical multiplexing (stat-mux) which encodes several video programs in parallel using, for example, MPEG-2 compatible video encoders. A joint rate control strategy is presented which dynamically allocates bit rates among the encoders. The bit rate of each encoder is determined based on relative complexities of the programs and scene changes occurring within the programs being encoded. The technique requires no external pre-processing of the input video signals. Furthermore, the encoding of video sources is not restricted to requiring the same GOP structure and GOP length in each encoder. Advantageously, each encoder can change its bit rate at GOP boundaries, while still operating at constant bit rate inside the GOPs. Overall, this strategy results in a piece-wise constant, but variable bit rate compression. The encoders can operate with different GOP-lengths and structures, and can be encoding at different times. Thus, there can be time intervals when the sum of the individual bit rates is larger or smaller than the predefined channel bit rate. Further, a strategy is proposed for scene changes which ensures quick reaction of the system to scene changes, thereby resulting in improved picture quality.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
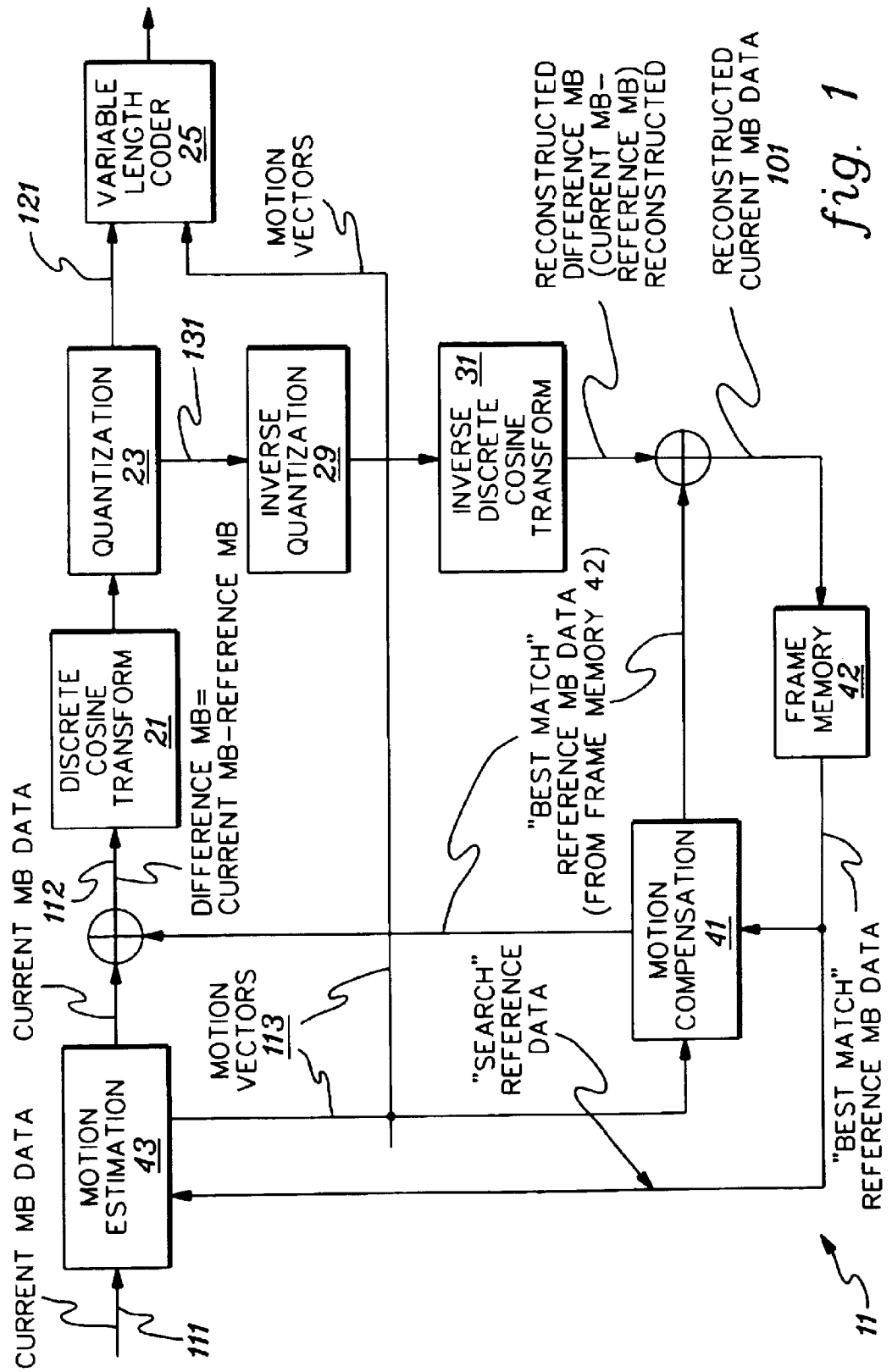
FIG. 1 shows a flow diagram of a generalized MPEG-2 compliant encoder 11, to be employed in a statistical multiplexer (stat-mux) system in accordance with the principles of the present invention.
Figure 2:
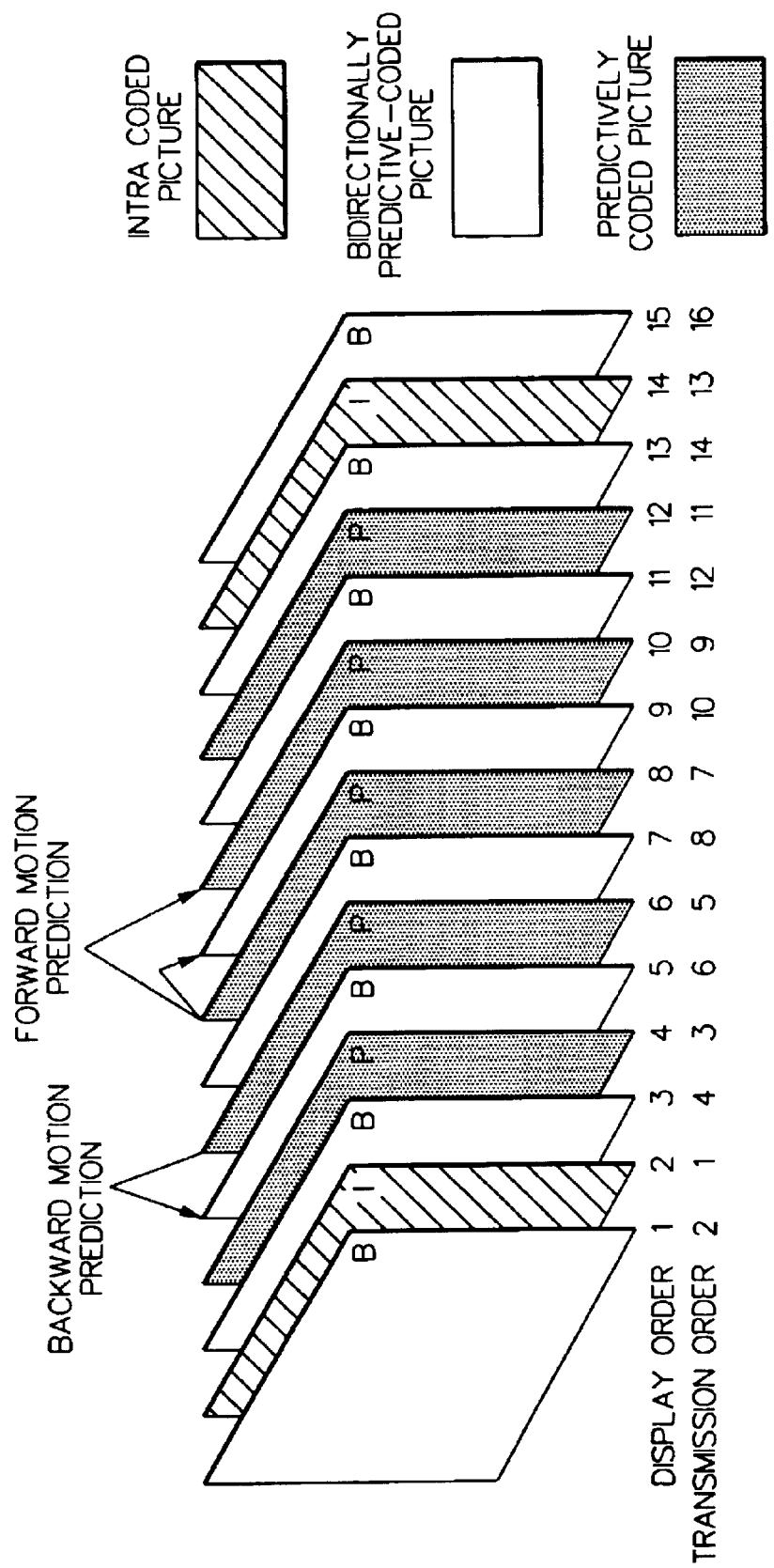
FIG. 2 illustrates I, P, and B pictures, examples of their display and transmission orders, and forward, and backward motion prediction.

As briefly noted above, this invention relates to a statistical multiplexing control strategy for encoding multiple streams (e.g., channels) of video programs in parallel using multiple video encoders. An external joint rate control strategy is employed which dynamically allocates bit rates among the encoders (which may comprise MPEG compliant encoders and encoding processes such as described in the above-incorporated MPEG-2 International Standard). The bit rate of each encoder is determined based on relative complexities of the programs and adjustments are made at scene changes and GOP boundaries inside the programs. The proposed technique does not require any external pre-processing of the input sources. FIGS. 1 & 2 depict the operation of a single video encoder to be employed in a control strategy in accordance with this invention.

For purposes of illustration, a generalized flowchart of MPEG compliant encoding is shown in FIG. 1. In the flowchart the images of the $i^{th}$ picture and the $i+1^{th}$ picture are processed to generate motion vectors. The motion vectors predict where a macroblock of pixels will be in a prior and/or subsequent picture. The use of motion vectors is a key aspect of temporal compression in the MPEG standard. As shown in FIG. 1, once generated, motion vectors are used for the translation of the macroblocks of pixels, from the $i^{th}$ picture to the $i+1^{th}$ picture.

In the encoding process of FIG. 1, the images of the $i^{th}$ picture and the $i+1^{th}$ picture are processed in encoder 11 to generate motion vectors. An input image 111 of a subsequent picture goes to the motion estimation unit 43 of the encoder. Motion vectors 113 are formed as the output of the motion estimation unit 43. These vectors are used by the motion compensation unit 41 to retrieve macroblock data from previous and/or future pictures, referred to as "reference" data, for output by this unit. One output of the motion compensation unit 41 is negatively summed with the output from the motion estimation unit 43 and goes to the input of the discrete cosine transformer (DCT) 21. The output of the discrete cosine transformer 21 is quantized in a quantizer 23. The output of the quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in frame memory 42. In the encoder shown for purposes of illustration, this second output 131 goes through an inverse quantization 29 and an inverse discrete cosine transform 31 to return a lossy version of the difference macroblock. This data is summed with the output of the motion compensation unit 41 and returns a lossy version of the original picture to the frame memory 42.

As shown in FIG. 2, there are three types of pictures. There are "Intra pictures" or "I" pictures which are encoded and transmitted whole, and do not require motion vectors to be defined. These "I" pictures serve as a reference image for motion estimation. There are "Predicted pictures" or "P" pictures which are formed by motion vectors from a previous picture and can serve as a reference image for motion estimation for further pictures. Finally, there are "Bidirectional pictures" or "B" pictures which are formed using motion vectors from two other pictures, one past and one future, and can not serve as a reference image for motion estimation.

The various picture types are quantized by encoder 11 in several steps. First, a quantization matrix, unique to a picture type, is applied to an 8×8 DCT block. The elements (weights) of the matrix are chosen such that importance is given to low frequency coefficients. These coefficients contain more information and contribute more to the perceptual quality of the picture. Then, a quantization scaling factor is computed based on the local image activity, complexity of the picture type, and a measure of buffer fullness. This index is directly related to the number of bits allocated to a picture and its perceived quality. The actual number of bits is obtained by first scanning each DCT block and then grouping the quantized coefficients together, according to the procedures defined in the MPEG-2 standard. Each group is entropy coded with a unique variable length code (VLC), using a Huffman lookup table. DC coefficients are encoded, employing differential pulse code modulation (DPCM) (similar to encoding of motion vectors) and uniform quantization.

The output of the entropy coder is input to an entropy decoder. The output of the decoder goes through an inverse scan, inverse quantization and inverse discrete cosine transformation to return a lossy version of the difference macroblock. The decoded picture is then passed through a delay to motion estimation and/or motion compensation, as is known in the art.

The operational functions of an MPEG-2 encoder are discussed in greater detail in commonly assigned, co-pending U.S. patent application Ser. No. 08/831,157, by Carr et al., filed Apr. 1, 1997, entitled "Control Scheme For Shared-Use Dual-Port Predicted Error Array," which is hereby incorporated herein by reference in its entirety. The fundamentals of constant bit rate (CBR) and variable bit rate (VBR) encoding schemes are described with reference to groups of pictures (GOPs) or frames in detail in commonly assigned, co-pending U.S. patent application Ser. No. 09/044,642, by N. Mohsenian, filed Mar. 19, 1998, entitled "Real-Time Single Pass Variable Bit Rate Control Strategy And Encoder," which is hereby incorporated herein by reference in its entirety. Adaptive encoding of a sequence of frames using image statistics such as described herein below, is described in additional detail in commonly assigned, co-pending U.S. patent application Ser. No. 09/046,118, by Boice et al., filed Mar. 20, 1998, entitled "Adaptive Encoding Of A Sequence Of Still Frames Or Partially Still Frames Within Motion Video," which is also hereby incorporated herein by reference in its entirety.

With the above information as background, statistical multiplexing and rate control strategy in accordance with the principles of the present invention is described below with reference to FIGS. 3–12.

In typical statistical multiplexing systems, several video bitstreams are multiplexed onto one single constant bit rate channel. Unfortunately, encoding of each program at a predefined constant bit rate can lead to picture quality degradation due to changes in scene content over time. Thus, the underlying objective of multi-program compression in accordance with the present invention is to dynamically distribute the available bandwidth among the programs in order to maximize the overall video quality of the system. This corresponds to equalizing the picture quality of all programs using a joint rate control algorithm that guides the individual coders. The invention allocates bit rates among the encoders according to the relative scene content of the video sources, while still meeting the requirement of a fixed channel bit rate.

More particularly, a system solution for statistical multiplexing is presented for encoding several video programs in parallel using MPEG-2 compatible video encoders. An external joint rate control algorithm that dynamically allocates bit rates among the encoders is described. The bit rate of each encoder is determined based on relative complexities of the programs and scene changes inside the programs. A system/method in accordance with the present invention does not require any external preprocessing of the input sources. Furthermore, the encoding of video sources is not restricted to having the same GOP structure or GOP length in each encoder. Each encoder changes its bit rate at GOP boundaries according to the joint rate control, while it operates at constant bit rate inside the GOPs. Overall, this strategy results in a piece-wise constant, variable bit rate compression. Experimental results show that a multi-program video compression system in accordance with the present invention results in good picture quality without external preprocessing, despite its relative simplicity. Furthermore, commercially available MPEG-2 encoder chips can be used successfully in this system.

Basically, two different approaches are possible for joint rate control, a feedback-approach or a look-ahead approach. In a feedback approach, statistics are generated by the encoders as a by-product of the encoding process. These statistics are then used to control the bit-allocation for the subsequent pictures. In a look-ahead approach, statistics are computed by a preprocessor prior to encoding, with these statistics then being used to adjust the bit rates before encoding the pictures. With either approach, finding the optimum statistics which describe the complexity of a program can be challenging. In the feedback approach, the statistics are mostly limited to coding related quantities. The look-ahead approach can have more freedom but the price is extra computational complexity and/or additional devices.

In both approaches, a joint rate control algorithm would calculate the bit rate for each picture and carry out the entire rate control for each of the individual encoders. This results in variable bit rate encoding. Conventionally, such a rate control algorithm would require mostly identical GOP structure in each encoder, which is, however, far from reality. Encoders can and do operate in different GOP lengths and structures.

Pursuant to this invention, a solution is disclosed for statistical multiplexing by dynamically allocating bit rates for the encoders using a feedback-approach. The rate control strategy distributes the channel bit rate among the encoders based on the relative complexity of the programs. The complexity of the programs is determined using coding statistics that are generated by the encoders along with the compressed bitstreams.

Instead of calculating the target bit rate for each picture by the joint rate control algorithm, the bit rates are changed at GOP boundaries, or if a scene change occurs. This strategy allows the encoders to operate at constant bit rate inside the GOPs, resulting in a piece-wise constant, but variable bit rate compression. The encoders do not have to have identical GOP structures, that is, GOP boundaries can occur in each encoder at different times. Due to the different GOP structures of the encoders, a channel buffer and a corresponding buffer control feedback loop are incorporated into a system in accordance with the present invention. At scene changes, quick reactions are assured by changing GOP structures dynamically and allowing adequate bit rate changes. The present system/method may be implemented using, for example, International Business Machines' single chip MPEG-2 video encoders, part number IBM39 MPEGS422 PBA 17C.

Section 1 below describes a multi-program video compression system in accordance with the present invention. The joint rate control strategy of this invention is then presented in detail in Section 2. The strategy for joint rate control in the case of scene change is described in Section 3. Determination of the minimum size of the channel buffer and the corresponding channel buffer control is given in Section 4. A possible use of commercially available single chip MPEG-2 encoders in the present system is highlighted in Section 5. Experimental results are then given in Section 6.

1. Multi-Program Video Compression System

Figure 3:
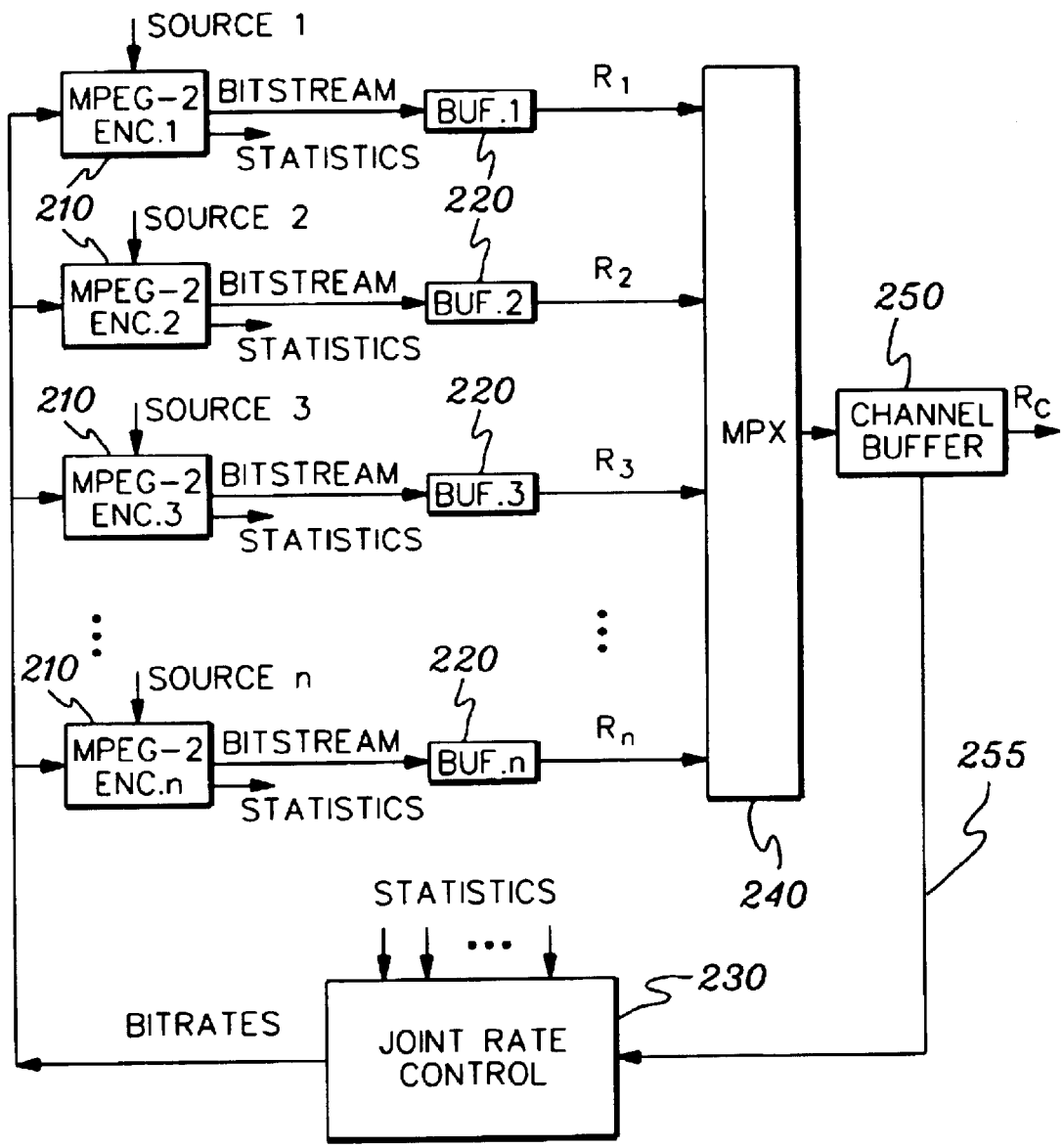
FIG. 3 depicts an example of a multi-stream video compression stat-mux system implemented in accordance with the present invention.

FIG. 3 shows a multi-program video compression system 200 to encode several programs (Source 1, Source 2, . . . Source n) in parallel using the feedback approach of the present invention. The example system 200 consists of several MPEG-2 video encoders 210, individual buffers 220 connected to the encoders 210, a joint rate controller 230, a multiplexer 240, and a channel buffer 250. Each encoder generates statistics about the picture that has just been encoded. These statistics are input parameters to the joint rate control algorithm 230, which calculates the bit rate of each individual encoder dynamically as described herein below.

In the proposed system 200 the bit rate of each encoder 210 is determined based on the relative complexities of the programs (Source 1, Source 2 . . . Source n), and upon occurrence of a scene change inside the corresponding program. The encoders preferably produce bitstreams compatible with the MPEG-2 standard. No additional preprocessing of the input sources is required, with the exception of scene change detection, which can be conventionally done either inside or outside of the encoders 210. Each encoder changes its bit rate at GOP boundaries or at scene changes according to the joint rate control 230. This allows the encoders to operate at a constant bit rate (CBR) inside the GOPs using the CBR video buffer verifier model according to the MPEG-2 standard. Overall, this strategy results in a piece-wise constant, but still variable bit rate compression.

The encoding of video sources is not restricted to having identical GOP structures or GOP lengths in each encoder. Since GOP boundaries can occur in each encoder at different times and bit rate changes take effect only at GOP boundaries, channel buffer 250 is employed to compensate possible overflow or underflow of the channel rate. A channel buffer control feedback 255 is also incorporated into the joint rate control algorithm 230 in order to prevent channel buffer 250 overflow or underflow.

In the following description of the present invention, the joint rate control strategy, determination of the minimum size of the channel buffer, and the corresponding channel buffer control are discussed in more detail.

2. Joint Rate Control

The joint rate control strategy presented herein is based on a feedback concept wherein statistics produced by the encoders (along with the compressed bitstream) are fed into the joint rate controller 230, together with the information on channel buffer 250 fullness. The bit rate of a program being encoded is assumed proportional to the ratio between the complexity of that program and the sum of the complexities of all programs being encoded in parallel:

$$R_i = R_c \cdot X_i \bigg/ \left( \sum_i X_i \right), \tag{1}$$

where $R_i$ is the bit rate of program i, $R_c$ is the channel rate and $X_i$ is the complexity of program i.

Determination of picture complexity is based on the used bit production model that is similar to the one suggested in MPEG-2 Test Model 5 (See ISO/IEC JTCI/SC29/WG11 N0400, "Test Model 5," April, 1993):

$$b_j = \frac{c_j}{Q_j},\quad (2)$$

where the model parameter $c_j$ is such that to produce a target number of bits $b_j$ in a picture, a certain quantization scale $Q_j$ has to be set. Based on Equation (2), the bit rate of program i can be calculated for a time interval of displaying a GOP as:

$$R_i = \frac{\sum_j (C_{ij}/Q_{ij})}{N_i/f_i},\quad (3)$$

where $c_{ij}$ is the bit production model parameter for picture j, $Q_{ij}$ is the quantization parameter for picture j, $N_i$ is the number of pictures in a GOP, and $f_i$ is the frame rate of program i. In a stat-mux system, the goal is to distribute the channel bandwidth among the programs such that:

$$\sum_i R_i \le R_C \quad (4)$$

To achieve the goal of equalizing the picture quality of all programs, an ideal quantization parameter can be derived using Equations (3) and (4):

$$Q_{ideal} = \frac{1}{R_c} \cdot \sum_i \left( (f_i/N_i) \cdot \sum_j c_{ij} \right) \quad (5)$$

This ideal quantization parameter can result in equal picture quality for all pictures in each program. Using $Q_{ideal}$ in Equation (3), the bit rate of each program is calculated as:

$$R_i = R_c \cdot \left[ (f_i/N_i) \cdot \sum_j c_{ij} \right] / \left[ \sum_i \left( (f_i/N_i) \cdot \sum_j c_{ij} \right) \right] \quad (6)$$

In a stat-mux system in accordance with this invention, $c_{ij}$ is equal to $b_{ij} \cdot Q_{ij}$, where $b_{ij}$ is bits used for encoding a picture and $Q_{ij}$ is the average quantization parameter. Furthermore, the complexity of a program is estimated as the average of the picture complexities using a sliding window of the GOP size.

Due to the relationship of the program complexities, bit rate changes may occur in a program at any of the GOP boundaries, even if a scene change did not take place in that program. If bit rate changes are too abrupt in a program with no scene cut, the picture quality may vary from GOP to GOP significantly, even if the total quality of the system is improved. To prevent this situation, the bit rate changes will be limited on GOP boundaries, but not at scene changes, where no restrictions are preferably imposed. For example, 10% changes relative to the previous bit rate at the GOP boundaries might be allowed if no scene change occurs. If a scene cut takes place, then there is no limitation on bit rate changes.

3. Joint Rate Control at Scene Changes

In a stream of video data, scene changes can occur at any time. They may happen at any picture type and at any GOP position. In the above discussion, it has been assumed that bit rate changes will be effective only at GOP boundaries and the encoders run in constant bit rate (CBR) mode inside the GOPs. A drawback to this approach is that the strategy prevents a quick reaction of the system to complexity changes of the programs. To overcome this problem, special processing is preferably employed in scene change situations.

Figure 4:
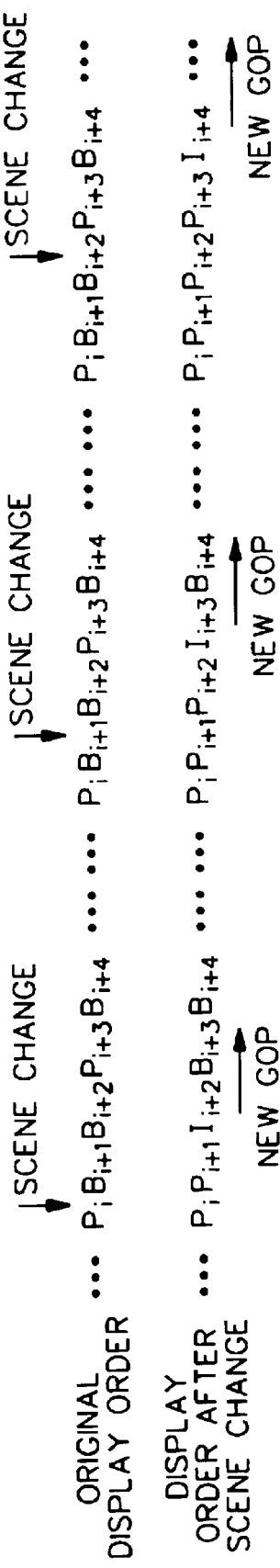
FIG. 4 is an example of group of picture structure changes at scene changes in accordance with the present invention.
Figure 5:
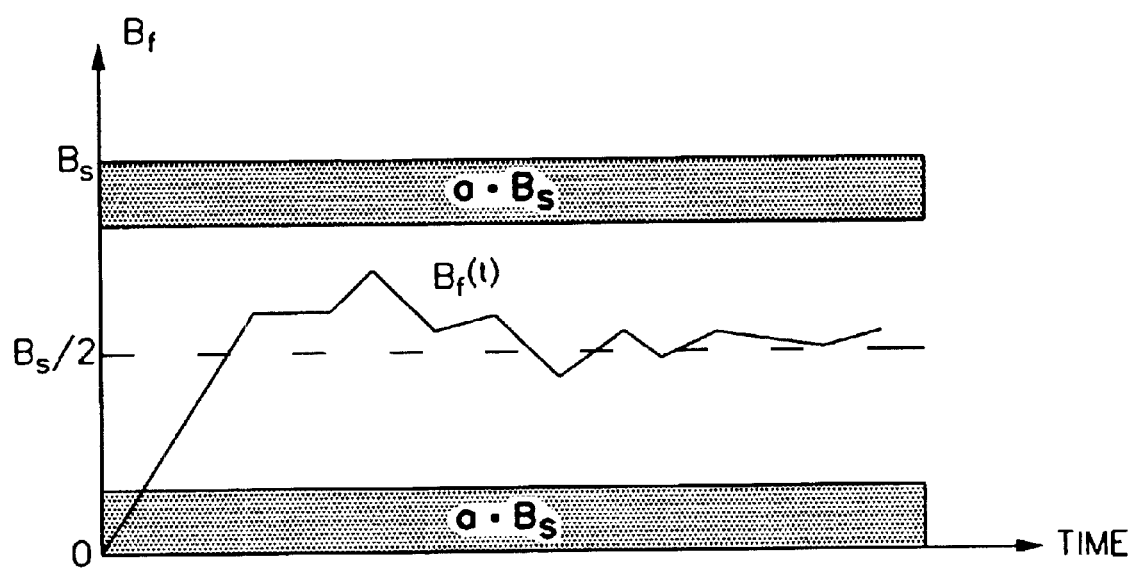
FIG. 5 is an example of channel buffer fullness versus time for stat-mux system in accordance with the present invention.

Scene change detection analysis is carried out between consecutive pictures of each program, either inside the encoders or externally, so that a scene change is known prior to encoding the first picture in a new scene. If a scene change occurs, the current GOP will be finished prematurely. In one embodiment, the first picture in the new-scene is encoded as the last picture of the prematurely-finished GOP and its statistics are then used to predict the complexity of the new scene, and consequently to calculate the bit rate for the subsequent GOP using Equation (6). FIG. 4 shows an example of original GOP structures, along with new ones if scene changes occur. Three cases are distinguished depending at which picture type the scene change takes place.

The prediction of the new-scene complexity is based on empirically determined relative complexities of different picture types. If the first picture of the new-scene, which is the last picture of the finishing GOP, is a P picture and every macroblock is encoded as intra, then the complexity of this picture is considered as an I complexity. Based on this I complexity the average complexity of the new scene, $X_i$, is estimated as:

$$X_i = \frac{X_I \cdot (1 + r_P \cdot n_P + r_B \cdot n_B)}{N_i/f_i},\quad (7)$$

where $X_I$ is the complexity of the I picture, $n_P$, $n_B$ are the number of P and B pictures in a GOP, and $r_P$, $r_B$ are the ratio of the P and B picture complexities with respect to the I picture complexity, respectively. Typical values of $r_P$ and $r_B$ are 0.5 and 0.25, respectively. The complexity $X_i$ is used in Equation (6) for the bit rate calculation. As more pictures are encoded in the new GOP, the complexity is preferably updated continuously by applying the actual bits used and average quantization parameters used to encode the pictures. As encoding of the GOP continues, the prediction of the complexity of the new scene will change by using the actual coding statistics.

Previously it was stated that the encoders are running in CBR mode inside the GOPs and that each encoder uses a CBR video buffer verifier model. No buffer under- or overflow is allowed. For example, a goal in the CBR rate control algorithm may be to ensure that buffer fullness at the end of the GOP will be the same as the initial buffer fullness (e.g. 80% of the buffer size). This may not always be the case, however, due to mismatch of the target bit budget and of the actual bits used per picture. Because of the over- or underproduction of bits in a GOP, the buffer fullness will be under or over the initial level, respectively. A considerably large buffer fullness error can accumulate. This error is carried over and tried to be compensated for in the next GOP. This rate control works fine if little or no bit rate changes take place at GOP boundaries. If bit rate changes are abrupt, however, such as at scene changes, a buffer fullness error (BFE) strategy in accordance with the present invention is applied to further improve the picture quality.

If scene change occurs, the buffer fullness error is considered to be zero at the beginning of the new GOP after a scene change. To prevent under- or overflow of the buffers connected to each encoder, the bit rate calculated by Equation (6) is modified as:

$$R_{imod} = R_i + E \cdot f_i / N_i,\quad (8)$$

where $R_i$ is the calculated bit rate for program i according to Equation (6), E is the buffer fullness error bits, $N_i$ is the number of pictures in a GOP and $f_i$ is the frame rate for program i. The bit rate of the program will be increased if the buffer fullness error is positive (the buffer fullness in the beginning of the GOP was less than the initial), or it will be decreased if E is negative. For rate control inside the GOP, the initial buffer fullness is considered as the buffer fullness at the end of the previous GOP instead of using, for e.g., 80% of the buffer size. The BFE strategy results in enhanced picture quality after scene changes.

4. Channel Buffer Size and Feedback Control

Due to the fact that the encoders can operate at different GOP-lengths and structures, or may start to encode at different times, there can be time intervals when the sum of the individual bit rates is larger or smaller than the predefined channel bit rate. To remedy this, a channel buffer is required, which will output the bitstream at exactly the channel bit rate. Two issues have to be considered in relation to this buffer. These are the determination of the minimum size of the buffer and the control strategy to prevent channel buffer under- and overflow.

Assume that the maximum total deviation from the channel bit rate is $\Delta R_{max}$ and, as a worst case, that the maximum duration of this deviation can be as large as the longest GOP-time among the encoders. For this case, the required minimum size of the channel buffer is determined as:

$$B_s = 2 \cdot \Delta R_{max} \cdot tgop_{max}, \qquad (9)$$

where $\Delta R_{max} = \Sigma R_i - R_c$, and $tgop_{max}$ is the maximum GOP time.

In Equation (9), a factor of 2 is used because under- as well as overproduction of the channel bit rate is assumed and the buffer filled at first until half of this size, $B_s$, after which it continuously outputs bits at the rate of $R_c$. In this case, the initial delay corresponds to the time required to fill the buffer until half of its size. As an example, if the channel buffer rate is 16 Mbits/s, $\Delta R_{max}$ is 8 Mbits/s and $tgop_{max}$=0.5 s, the minimum buffer size is 8 Mbits, and the corresponding initial delay is 0.25s at the frame rate of 30 frames/s. Note that if a smaller channel buffer than the one determined by Equation (9) is desired for use in the stat-mux system, then the maximum total deviation from the channel bit rate has to be limited accordingly.

To prevent channel buffer under- or overflow, a buffer model (shown in FIG. 5) is preferably used. The channel buffer model includes predefined guard bands at the top and the bottom of the buffer. These guard bands are used to regulate the distribution of the bit rates. To prevent under- and overflow, the buffer fullness $B_f$ at any time has to fulfill:

$$0 < B_f(t) < B_s \qquad (10)$$

The parameter 'a' determines the size of the guard band and it can be chosen, for example, as 0.25.

Depending on the actual buffer fullness, $B_f$, there are three cases, which can be distinguished. These cases together with the corresponding modification of the bit rates are listed below:

Case 1:
This is the case when the buffer fullness is between the guard bands, that is:

$$a \cdot B_s \leq B_f \leq (1-a) \cdot B_s \qquad (11)$$

In this case, the calculated bit rates for the programs are not modified generally, except at extreme circumstances.

if $\Sigma R_i > R_c$ and $\Sigma R_i - R_c > (B_s - B_f)/tgop_{max}$ then $R_i = R_i \cdot [R_c + ((1-a)B_s - B_f)/tgop_{max}]/(\Sigma R_i)$ (12)

(No overflow)

if $\Sigma R_i < R_c$ and $R_c - \Sigma R_i > B_f/tgop_{max}$ then $R_i = R_i \cdot [R_c - (B_f - aB_s)/tgop_{max}]/(\Sigma R_i)$ (13)

(no underflow)
otherwise: no action

Case 2:
This is the case when the buffer fullness is in the upper guard band:

$$B_f > (1-a) \cdot B_s \qquad (14)$$

In this case only bit rate changes are allowed which will decrease buffer fullness or stay at $B_f$.

if $\Sigma R_i > R_c$ then $R_i = R_i \cdot (R_c/(\Sigma R_i))$ (15)

(Scaling down)

if $\Sigma R_i < R_c$ and $R_c - \Sigma R_i > B_f/tgop_{max}$ then $R_i = R_i \cdot [R_c - (B_f - aB_s)/tgop_{max}]/(\Sigma R_i)$ (16)

(No underflow)
otherwise: no action

Case 3:
This is the case when the buffer fullness is in the lower guard band:

$$B_f < a \cdot B_s \qquad (17)$$

In this case only bit rate changes are allowed which will increase the buffer fullness or stay at $B_f$.

if $\Sigma R_i < R_c$ then $R_i = R_i \cdot (R_c/(\Sigma R_i))$ (18)

(Scaling up)

if $\Sigma R_i > R_c$ and $\Sigma R_i - R_c > (B_s - B_f)/tgop_{max}$ then $R_i = R_i \cdot [R_c + ((1-a)B_s - B_f)/tgop_{max}]/(\Sigma R_i)$ (19)

(No overflow)
otherwise: no action

5. Using an MPEG-2 Encoder in the Stat-mux System

All MPEG-2 encoders used in a multi-program video compression system in accordance with the principles of the present invention must be capable of providing at least the necessary statistics required by the joint rate control algorithm discussed above. Encoders must also have the ability to change bit rates at GOP boundaries. To further exploit the advantages of this invention, in the event of scene changes encoders must be able to change GOP structure dynamically, provide quantities for calculating the buffer fullness error and carry out scene change detection and reaction either internally or externally.

6. Experimental Results

In order to demonstrate the performance of a system constructed in accordance with the present invention, several experiments were carried out via simulation, using image sequences of different scene contents. The developed multi-program video compression system has been simulated using four MPEG-2 encoders (Enc.1, Enc.2, Enc.3 and Enc.4). Each of the encoders had the capability of outputting the required image statistics. The scene change detection was carried out inside the encoders. The video sources were chosen in such a way that each of them represented different scene contents, e.g., sport scenes, nature, head-and-shoulder picture scenes, etc., and each included scene changes.

The first set of video sources were Japan IBM Commercial, Table Tennis, Flower Garden & Mobile Calendar (Flower Garden followed by Mobile and Calendar) and a Care with MTV logo in 4:2:2 chroma format. The sources were encoded in 4:2:0 chroma format. Two B pictures were located between anchor pictures. Closed GOP-length was chosen as 16 in Enc.1 and 2 and as 13 in Enc.3 and 4. The frame rate was 29.97 frames/s at each encoder. Channel rate was 16 Mbits/s and the channel buffer size was 8 Mbits according to Equation (9). Each encoder started encoding at a bit rate of 4 Mbits/s. This initial bit rate was changed dynamically according to the joint rate control strategy of the present invention.

Figure 6:
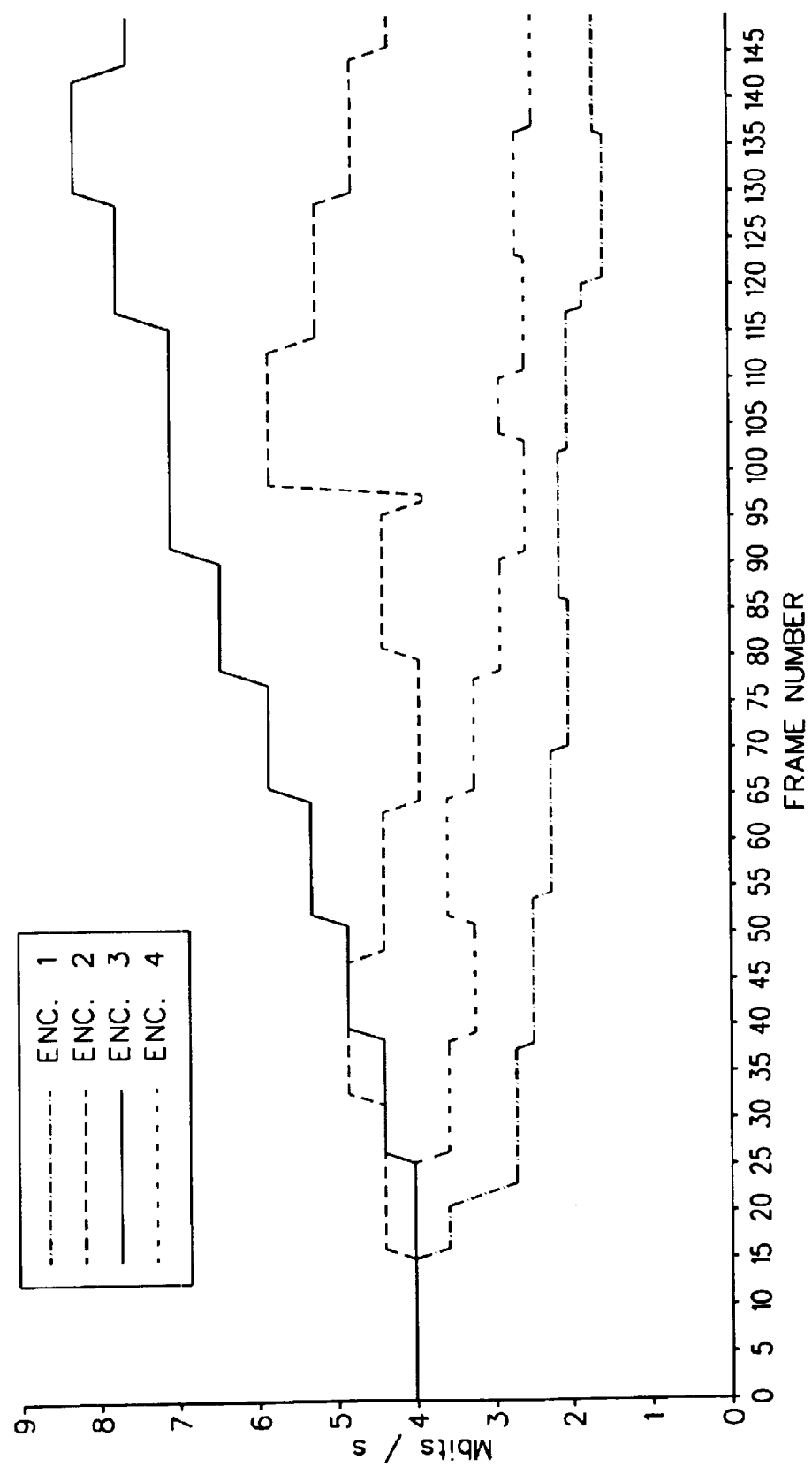
FIG. 6 depicts an example of bit rates for encoding a first set of video sources at 16 Mbits/s channel bit rate in a stat-mux system pursuant to the present invention.

FIG. 6 shows the bit rates allocated dynamically to each encoder using the joint rate controller. It can be seen that the Japan IBM Commercial and MTV sequence had lower bit rates with respect to the other two sources.

Figure 7:
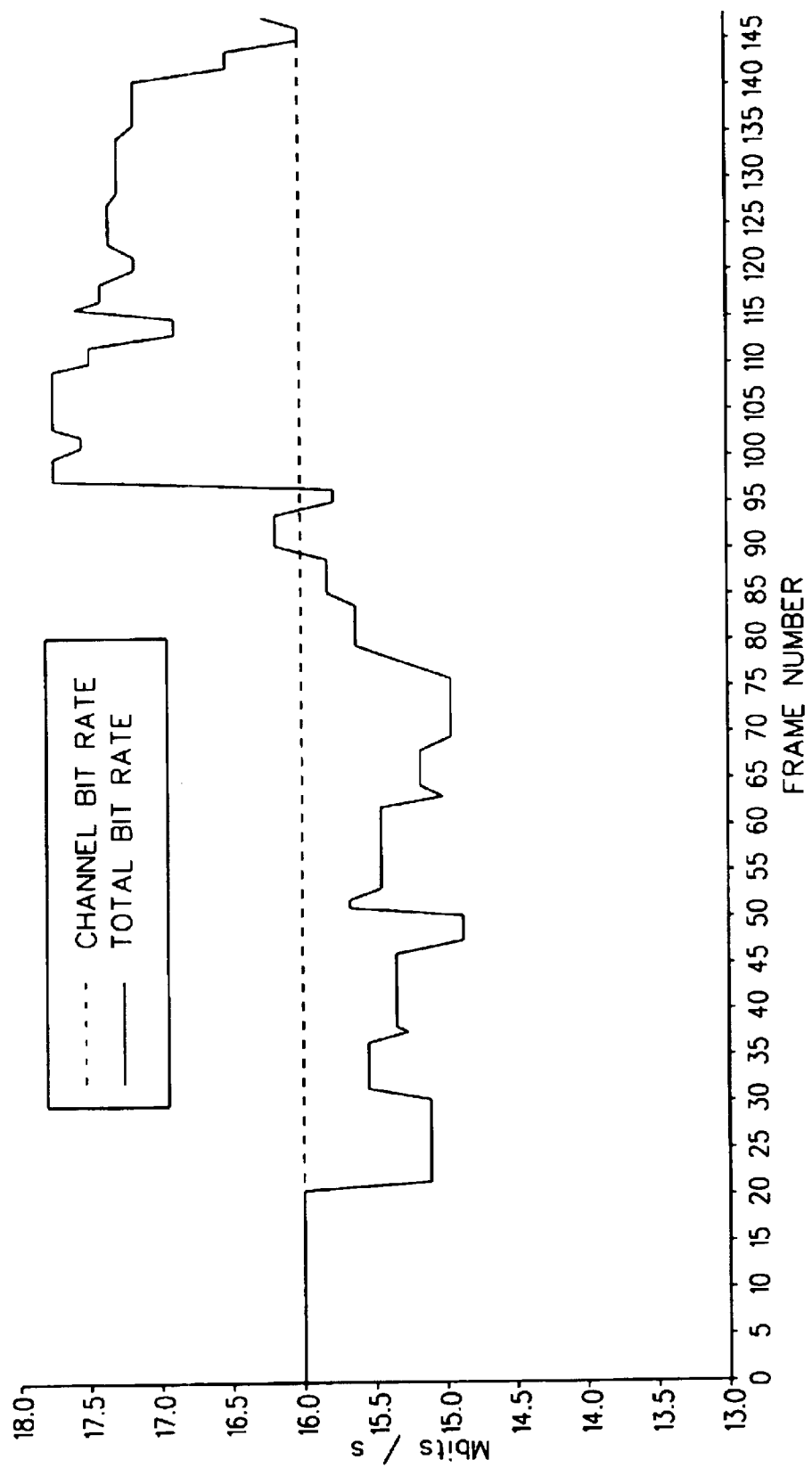
FIG. 7 is a graph of a total bit rate for encoding the first set of video sources ($R_c$=16 Mbits/s) of FIG. 6.

The total bit rate generated by the four encoders using the first set of video sources is given in FIG. 7. The graph indicates the under- or overproduction of the channel bit rate at 16 Mbits/s demonstrating the necessity of the channel buffer and feedback control.

The performance of the proposed system was compared to a scheme where each encoder codes its source at a fixed bit rate. These encoders carried out scene change detection themselves. Table 1 shows the average PSNR values achieved by the present system and by fixed bit rate (4 Mbits/s) in CBR mode for the first set of video sequences. As the table indicates, the easy sources (Japan IBM, MTV) were encoded at a slightly lower quality in the stat-mux system than at a fixed 4 Mbits/s rate. However, this allows the more complex sources (Table Tennis, FG & MC) to be encoded at higher quality in the proposed system than in the fixed CBR mode. Thus, the stat-mux system in accordance with the present invention provided a better overall picture quality than the fixed bit rate one.

TABLE 1

| | Average PSNR [dB] | |
|---|---|---|
| Sources | Stat-mux $R_c$ = 16 Mbits/s | CBR 4 Mbits/s |
| Japan IBM (Enc. 1) | 38.48 | 40.11 |
| Table Tennis (Enc. 2) | 32.11 | 31.29 |
| FG & MC (Enc. 3) | 30.26 | 28.24 |
| MTV (Enc. 4) | 37.79 | 38.65 |

Table 2 shows the average PSNR values for channel bit rate at 32 Mbits/s with channel buffer of 16 Mbits, and for fixed bit rate at 8 Mbits/s CBR mode, using the same video sources.

TABLE 2

| | Average PSNR [dB] | |
|---|---|---|
| Sources | Stat-mux $R_c$ = 32 Mbits/s | CBR 8 Mbits/s |
| Japan IBM (Enc. 1) | 40.49 | 42.40 |
| Table Tennis (Enc. 2) | 35.36 | 34.61 |
| FG & MC (Enc. 3) | 34.16 | 31.70 |
| MTV (Enc. 4) | 39.96 | 41.00 |

Figure 8:
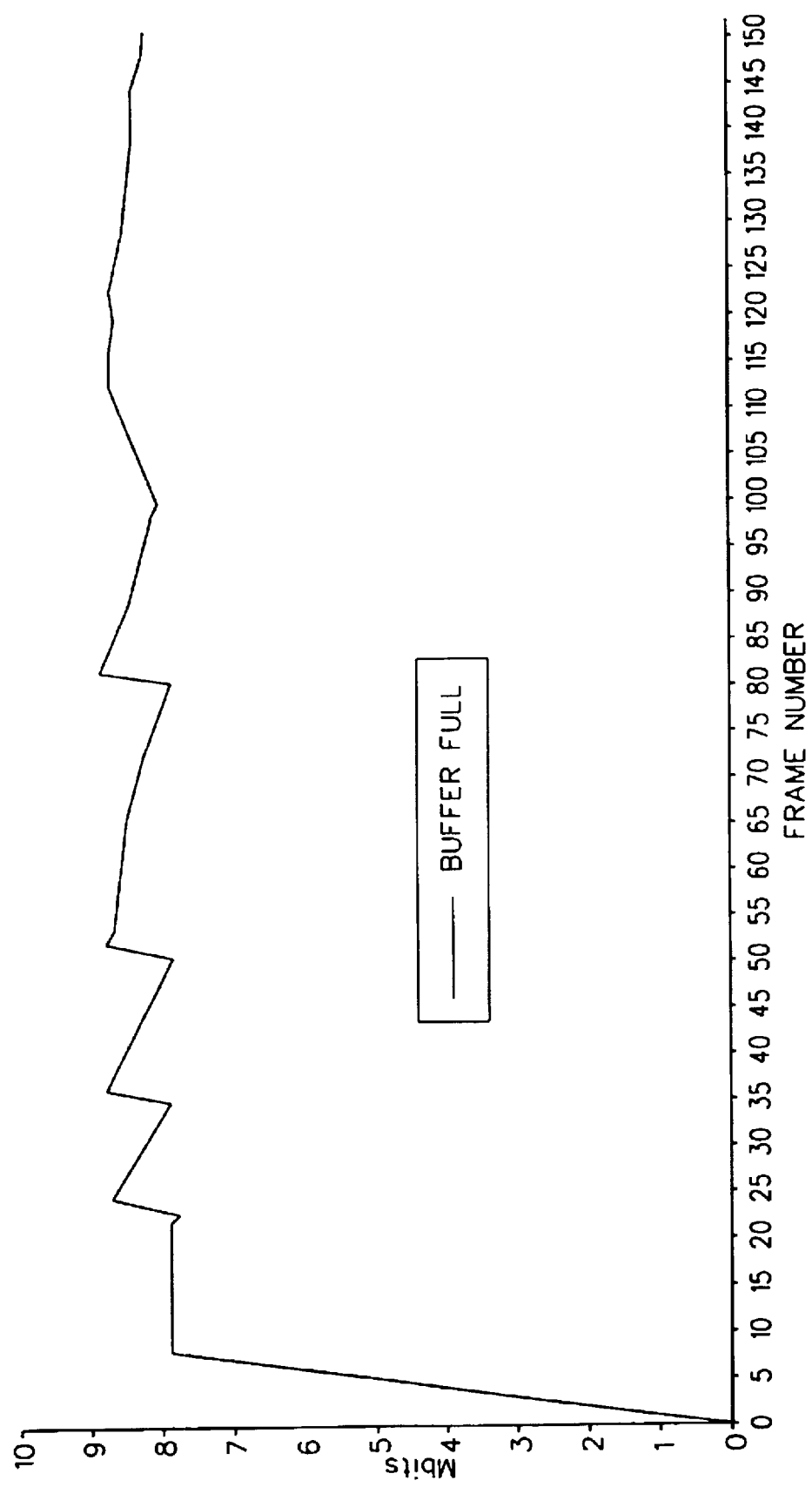
FIG. 8 is a graph of channel buffer fullness for recording the first set of video sources of FIG. 6 at 32 Mbits/s channel bit rate using a channel buffer of 16 Mbits/s.

To demonstrate the effectiveness of the channel buffer model and feedback control, FIG. 8 shows the buffer channel fullness during encode of the sequences at a channel bit rate of 32 Mbits/s. As the figure indicates, no buffer under- or overflow occurred during encoding.

For channel bit rate at 16 Mbits/s, Table 3 includes the PSNR values for the first pictures after scene changes using the proposed buffer fullness error (BFE) strategy and without it. As the table indicates, about 0.64–2.17 dB PSNR improvements were achieved using the BFE strategy described herein as compared to the algorithm without it.

TABLE 3

| | PSNR [dB] | | | | PSNR [dB] | | | |
|---|---|---|---|---|---|---|---|---|
| | ENC. 1 | | | | ENC. 1 | | | |
| Pictures | $I_{22}$ | $B_{23}$ | $B_{24}$ | $P_{25}$ | $I_{121}$ | $B_{122}$ | $B_{123}$ | $P_{124}$ |
| With BFE strategy | 34.79 | 36.75 | 36.44 | 35.80 | 39.86 | 40.07 | 40.37 | 40.18 |
| Without BFE strategy | 34.15 | 36.09 | 35.77 | 35.09 | 38.72 | 39.08 | 39.30 | 38.99 |

| | ENC. 2 | | | | ENC. 4 | | | |
|---|---|---|---|---|---|---|---|---|
| Pictures | $I_{98}$ | $B_{99}$ | $B_{100}$ | $P_{101}$ | $I_{111}$ | $B_{112}$ | $B_{113}$ | $P_{114}$ |
| With BFE strategy | 30.49 | 33.52 | 33.49 | 32.55 | 39.00 | 39.09 | 38.48 | 38.77 |
| Without BFE strategy | 28.55 | 31.35 | 31.50 | 30.38 | 38.03 | 38.20 | 37.45 | 37.60 |

Figure 9:
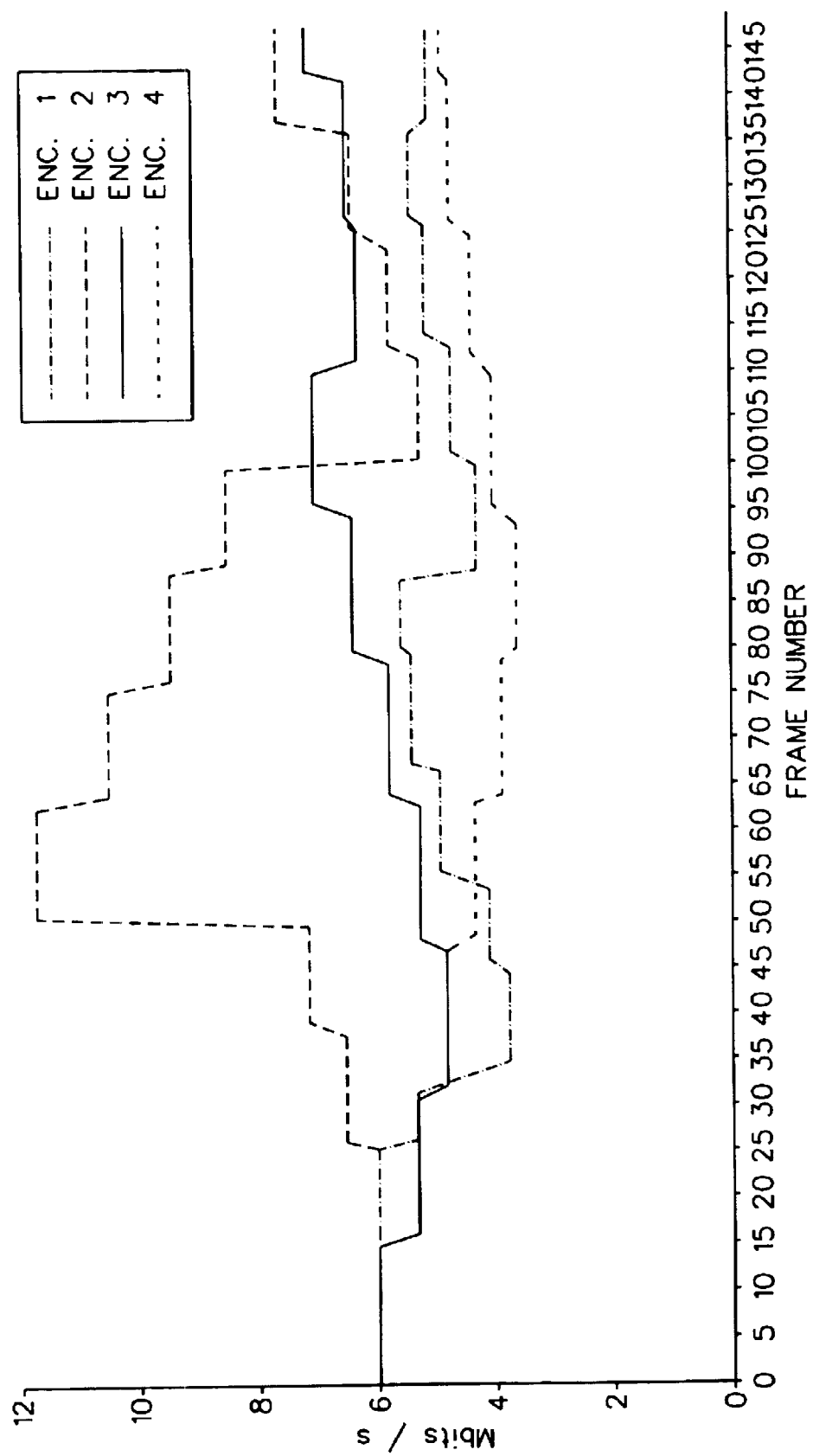
FIG. 9 depicts an example of bit rates for encoding a second set of video sources at 24 Mbits/s channel bit rate in a stat-mux system pursuant to the present invention.
Figure 10:
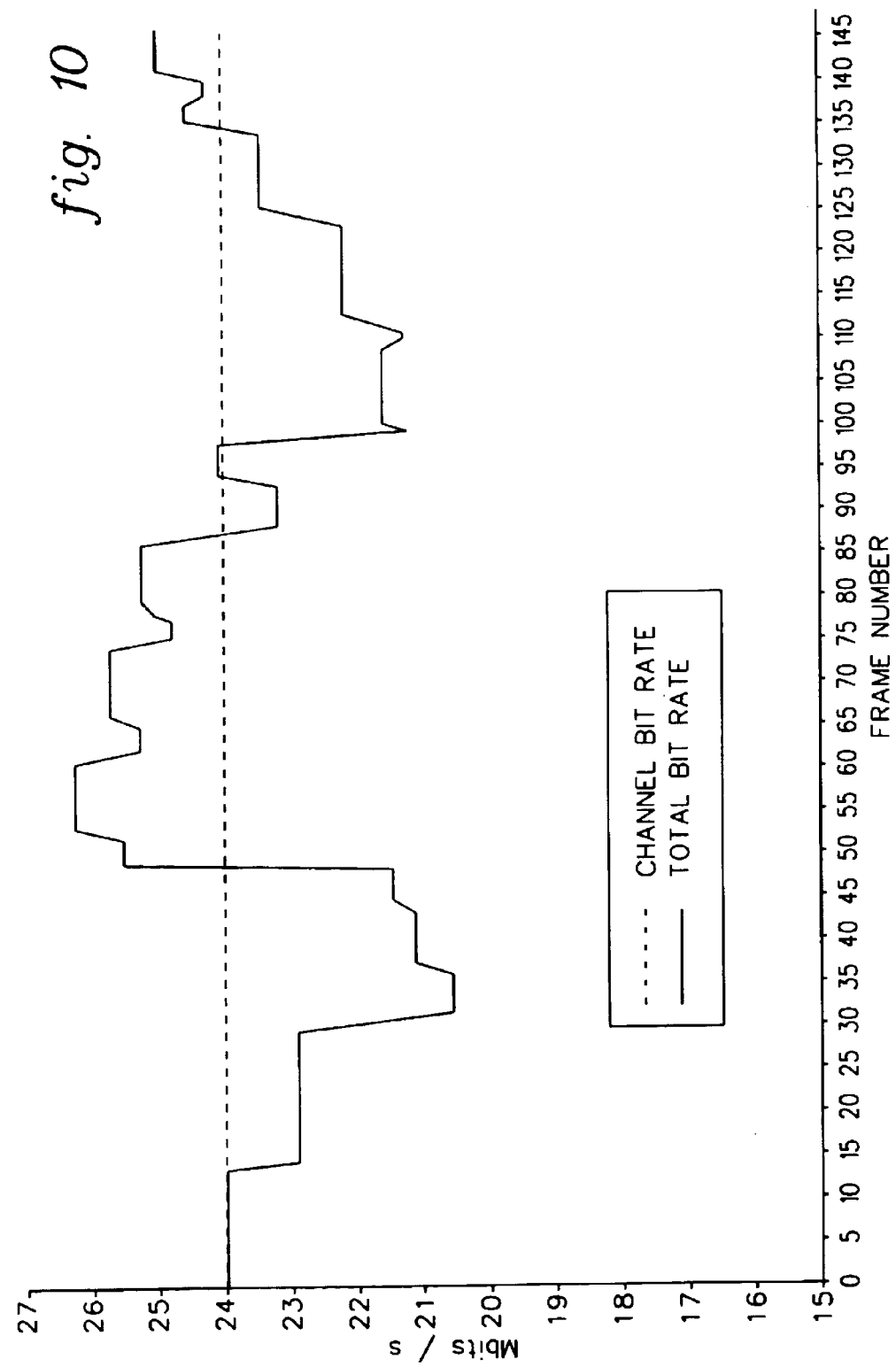
FIG. 10 depicts a total bit rate for encoding the second set of video sources ($R_c$=24 Mbits/s) of FIG. 9.

For a second set of experiments, IBM WorldBook Commercial (Enc.1), Mixd (Enc.2), Football (Enc.3) and Mixe (Enc.4) were used as input sources. Mixd consists of the Bike, Skyscraper and Basketball sequences, while in Mixe the Susie sequence is followed by a Forest with Cottage scene. These sources are somewhat more complex than the first set of video sources, thus the channel bit rate was chosen as 24 Mbits/s and the channel buffer was 12 Mbits. The coding parameters were the same as in the first set of experiments, except the closed GOP-length was 13 for Enc.1 and 2, while it was 16 for Enc.3 and 4. In the CBR case, the bit rate was fixed at 6 Mbits/s. FIG. 9 shows the dynamic bit rate changes for the encoders according to the joint rate control strategy of this invention. The total bit rate for encoding the second set of video sources is given in FIG. 10, which indicates the under- and overproduction of the channel bit rate at 24 Mbits/s.

Table 4 includes the average PSNR values achieved by the proposed system and by fixed bit rate (6 Mbits/s) in CBR mode. This table indicates the same trend in visual quality as achieved for the first set of experiments. The stat-mux system of the present invention has resulted in a slightly lower picture quality for simple sources (IBM Worldbook, Mixe), while it improved the quality of the more complex sources (Mixd, Football) in comparison to the CBR mode.

TABLE 4

| | Average PSNR [dB] | |
|---|---|---|
| Sources | Stat-mux $R_c$ = 24 Mbits/ | CBR 6 Mbits/s |
| IBM Worldbook (Enc. 1) | 37.03 | 37.72 |
| Mixd (Enc. 2) | 33.74 | 33.19 |
| Football (Enc. 3) | 37.67 | 37.58 |
| Mixe (Enc. 4) | 38.68 | 39.37 |

Figure 11:
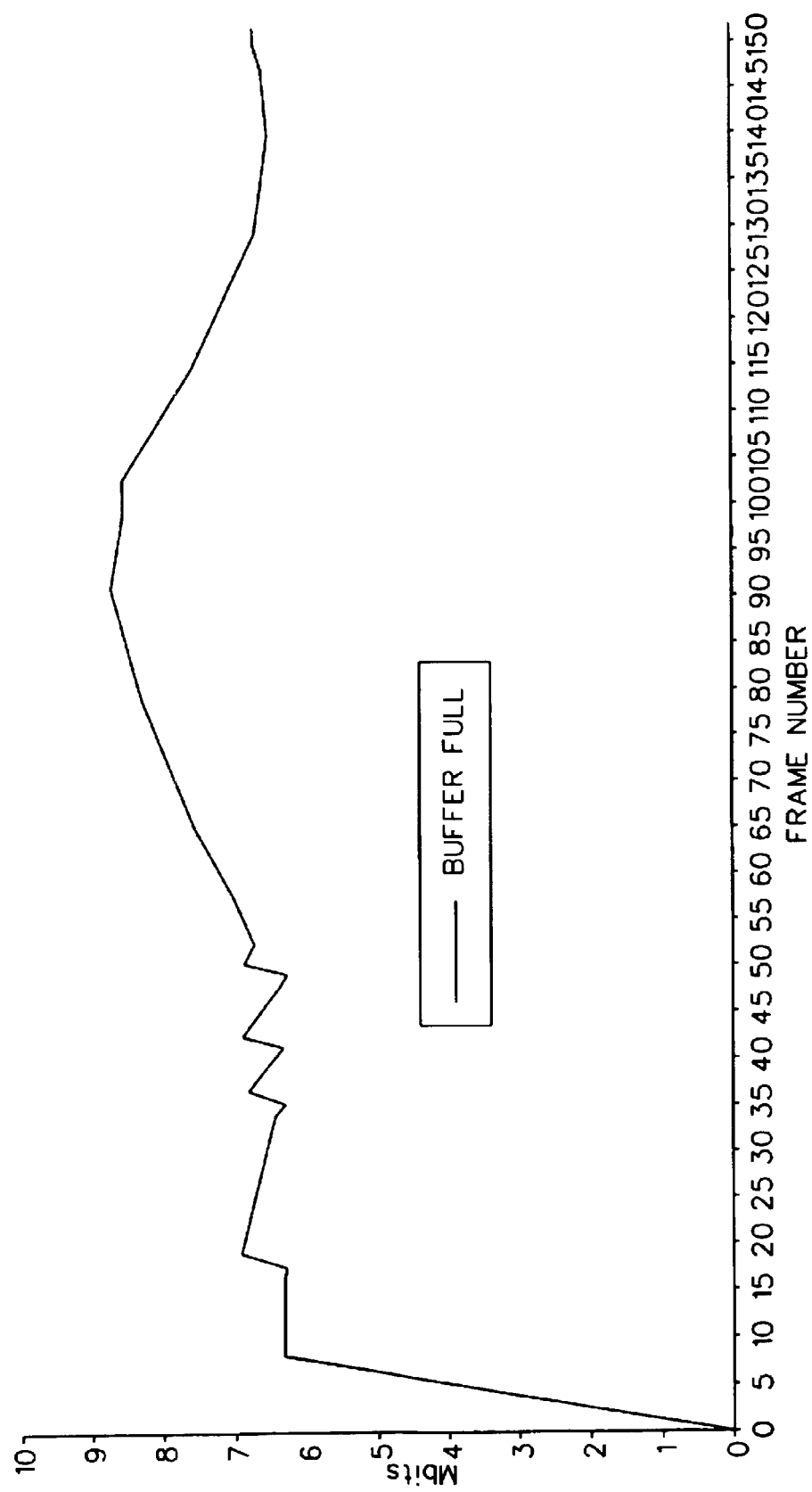
FIG. 11 is a graph of channel buffer fullness for encoding the second set of sources of FIG. 9 at 24 Mbits/s channel bit rate using a channel buffer of 12 Mbits/s.

The channel buffer fullness for encoding this second set of video sources at 24 Mbits/s channel bit rate is given in FIG. 11, indicating no buffer under- or overflow.

7. Process Overview

Figure 12:
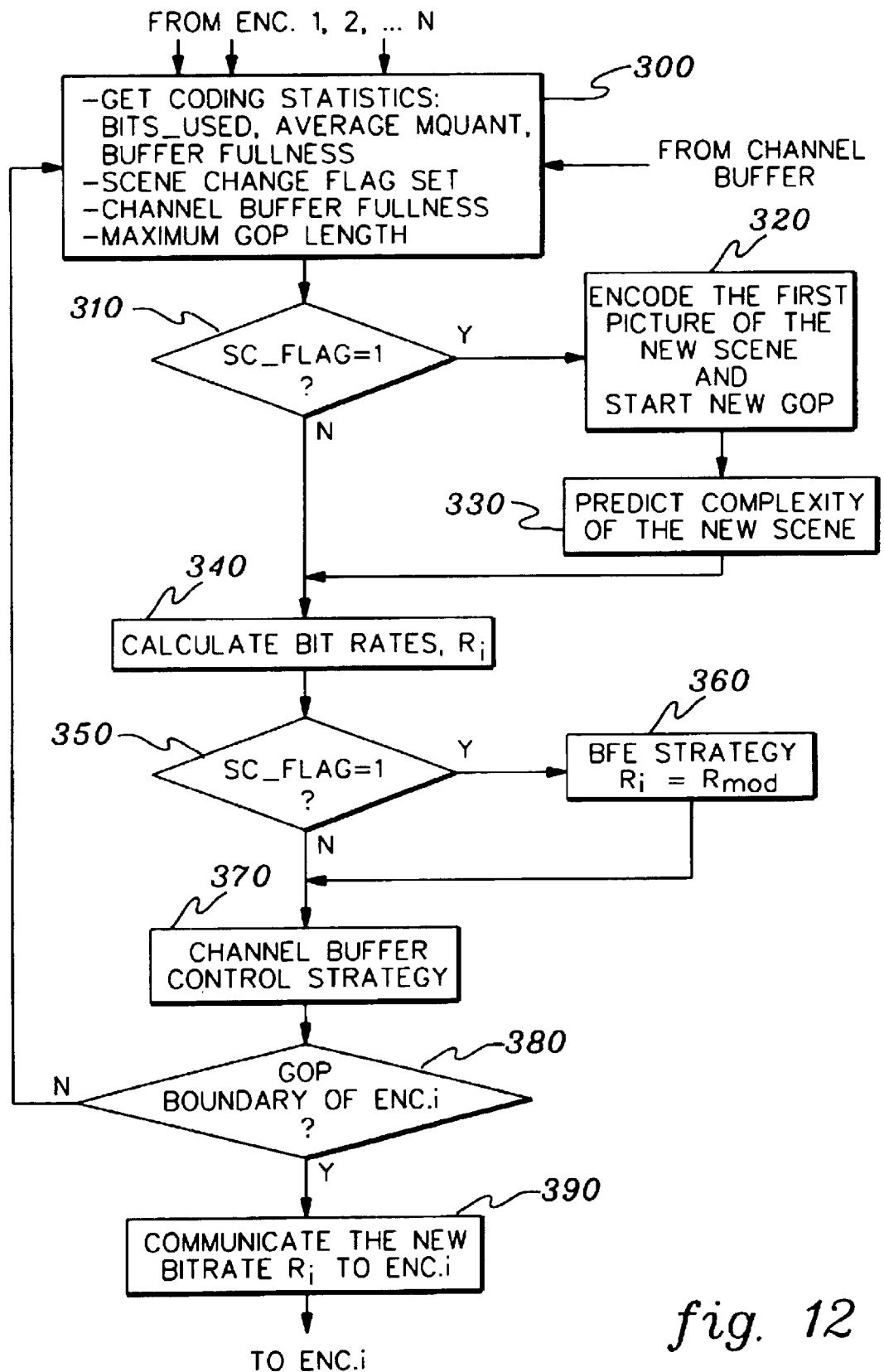
FIG. 12 is a flowchart of one embodiment of stat-mux rate control processing in accordance with the principles of the present invention.

FIG. 12 depicts an overview of encode processing in accordance with the present invention. Statistics are fed from the individual encoders as feedback to the rate controller. These statistics can include bits used, average MQUANT, and buffer fullness 300. Additionally, information is provided on scene change occurring at each stream of video frames, channel buffer fullness and a maximum GOP length occurring in the system as described above. The channel buffer fullness is received as a feedback signal from the channel buffer itself. The bit rate controller initially determines whether a scene change flag has been set 310, indicative of a scene change. If YES, then the first frame of the new scene is either encoded as the last frame of the prior scene or as the first picture of a new one picture GOP 320. This first picture of the new scene is then employed to predict complexity of the new scene 330.

A bit rate $R_i$ is calculated for each encoder 340. Processing then again determines whether the scene change flag had been set 350, and if so, a buffer fullness error strategy 360 is employed to modify the bit rate $R_i$ for the encoder. A channel buffer control strategy 370 is implemented as described above, and processing determines whether the current frame is at a GOP boundary of the stream of video frames being encoded at encoder ENC.i 380. If NO, processing returns to collect a next set of input parameters 300. If the current frame is at a GOP boundary, then the new bit rate $R_i$ is communicated to the encoder ENC.i 390.

To again summarize in accordance with this invention, a joint rate control strategy is presented which dynamically allocates bit rates among multiple encoders for encoding video streams in parallel for multiplexing onto a common channel. The channel bit rate is distributed among the encoders based on relative complexity of the programs and scene changes occurring with the programs. The method described herein does not require external preprocessing of the input sources. The complexity of the programs is determined based on coding statistics and scene change detection, which are generated by the encoders along with the compressed bitstreams. Instead of calculating the target bit rate for each picture, the bit rates are changed at GOP boundaries or if a scene change occurs. This allows the encoders to operate in constant bit rate (CBR) inside the GOPs.

Changing bit rate only at GOP boundaries limits reaction time of the joint rate controller for complexity changes of the programs. To address this issue, the scene change detection is assumed to be carried out between each consecutive picture in a stream of video frames, and it is assumed known prior to encoding the first frame in the new scene. Furthermore, an assumption is made that the encoders are capable of changing GOP structure dynamically, which is a capability available on commercially available encoders. If a scene change occurs, the current GOP is prematurely finished and the first picture of the new scene is encoded. The statistics from this first picture of the new scene are then used to predict the complexity of the new scene, and consequently, to calculate the bit rate for the subsequent GOP.

In order to improve picture quality in case of scene change, a further modification was developed. Specifically, the buffer fullness error, resulting from the over- or underproduction of bits in a GOP, is considered to be zero at the beginning of a new GOP after a scene change. In order to prevent under- or overflow in the buffers connected to each encoder, the bit rate calculated by the joint rate controller is modified. The bit rate of the program will be increased if the buffer fullness error is positive (the buffer fullness in the beginning of the GOP was less than the initial buffer fullness, (e.g., 80% of buffer size)) or it will be decreased if it is negative. This strategy results in a better picture quality after scene change. The concept can also be extended for encoders without dynamic GOP structure capability, and with the scene change detection being carried out externally.

The encoders operate preferably at the same frame rate, but may have different GOP-lengths and structures or begin encoding at different times. Thus, there can be time intervals when the sum of the individual bit rates is larger or smaller than the pre-defined channel bit rate. A channel buffer is incorporated in the system, which will output the multiplexed bit stream exactly at the channel bit rate. A method to determine the minimum size of the channel has also been developed. It is based on the allowable total deviation from the channel bit rate, and maximum GOP time occurring in the system. In order to prevent channel buffer under- or overflow, a buffer feedback is also incorporated into the joint rate controller.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be affected by those skilled in the art. Accordingly, it is intended by the appended claims to cover all such modifications and changes as fall within the true spirit and scope of the invention.

What is claimed is:

1. A method for processing multiple streams of video frames comprising:

encoding in a single pass frames of said multiple streams of video frames in parallel without a priori statistical analysis of current frames being encoded;

dynamically adapting encoding of subsequent frames of at least one stream of video frames of said multiple streams of video frames based on relative complexity of the current video frames being encoded;

wherein said dynamically adapting encoding comprises adjusting an encode bit rate employed by said single pass encoding to encode said subsequent frames of said at least one stream of video frames;

wherein said adjusting said encode bit rate for said at least one stream of video frames only occurs upon beginning of a new group of frames (GOP); and wherein said single pass encoding comprises beginning a new GOP upon detection of a scene change within said at least one stream of video frames, wherein for said at least one stream of video frames said encode bit rate is constant within each GOP and is variable between GOPs.

2. The method of claim 1, wherein said dynamically adapting encoding comprises dynamically adapting encoding of each stream of video frames of said multiple streams of video frames based on relative complexity of the video frames comprising the multiple streams of video frames.

3. The method of claim 1, further comprising limiting adjusting of said encode bit rate to a predefined percent adjustment when beginning a new group of frames (GOP) without detection of a scene change in said at least one stream of video frames.

4. The method of claim 1, further comprising monitoring adjacent video frames of a stream of video frames of said multiple streams of video frames for detection of a scene change.

5. The method of claim 1, wherein said encoding produces multiple compressed video streams, and wherein said method further comprises buffering each compressed video stream in a buffer, and wherein said dynamically adapting encoding includes for each stream of video frames modifying said encode bit rate based on fullness of said buffer receiving said compressed video stream.

6. The method of claim 5, further comprising multiplexing said multiple compressed video streams onto a constant bit rate channel.

7. The method of claim 6, further comprising buffering said multiplexed compressed video streams in a channel buffer coupled to said constant bit rate channel, and wherein said dynamically adapting encoding includes for each stream of video frames modifying said encode bit rate based on fullness of said channel buffer.

8. The method of claim 7, further comprising predefining guard bands at upper and lower limits of the channel buffer and modifying said encode bit rate whenever buffer fullness is within one of said upper and lower guard bands of the channel buffer.

9. The method of claim 8, wherein when buffer fullness is in the upper guard band, said modifying of said encode bit rate comprises allowing a change in said encode bit rate only if the change will decrease buffer fullness or allow buffer fullness to remain the same, and when said buffer fullness is in the lower guard band, allowing a change in said encode bit rate only if said change will increase the buffer fullness or leave the channel buffer fullness unchanged.

10. The method of claim 8, further comprising determining a minimum buffer size for said channel buffer, said minimum buffer size being defined as:

$$B_s = 2 \cdot \Delta R_{max} \cdot tgop_{max},$$

wherein:

$\Delta R_{max} = \Sigma R_i - R_c$ $R_i$=calculated bit rate for stream i of video frames, $R_c$=channel bit rate, $tgop_{max}$=maximum GOP time.

11. The method of claim 1, wherein said encoding comprises encoding said multiple streams of video frames in parallel using multiple MPEG encoders, each MPEG encoder receiving one stream of video frames of said multiple streams of video frames.

12. The method of claim 1, wherein said encoding of said multiple streams of video frames in parallel produces multiple compressed video streams, and wherein said method further comprises multiplexing said multiple compressed video streams for transfer across a constant bit rate channel.

13. The method of claim 1, wherein said dynamically adapting encoding comprises employing a rate control algorithm to control said encode bit rate of said at least one stream of video frames, and wherein said rate control algorithm controls said encode bit rate of said at least one stream of video frames in part based on fullness of a buffer receiving a compressed video stream resulting from said encoding.

14. A method for processing multiple streams of video frames comprising:

encoding said multiple streams of video frames in parallel;

dynamically adapting encoding of each stream of video frames of the multiple streams of video frames based on relative complexity of the video frames comprising the multiple streams of video frames, wherein said dynamically adapting encoding comprises adjusting an encode bit rate employed by said encoding to encode each stream of video frames, wherein said adjusting of said encode bit rate for each stream of video frames occurs upon detection of a scene change in said stream of video frames or beginning of a new group of frames (GOP);

wherein said encoding produces multiple compressed video streams, and wherein said method further comprises buffering each compressed video stream in a buffer, and wherein said dynamically adapting encoding includes for each stream of video frames modifying said encode bit rate based on fullness of said buffer receiving said compressed video stream; and wherein said modifying of said encode bit rate comprises modifying said encode bit rate as:

$$R_{imod} = R_i + E \cdot f_i / N_i,$$

wherein:

$R_i$=calculated bit rate for stream i of video frames,

E=buffer fullness error bits, $N_i$=number of pictures in a GOP for stream i, and $f_i$=frame rate for stream i.

15. A method for processing multiple streams of video frames comprising:

encoding in a single pass frames of said multiple streams of video frames in parallel without a priori statistical analysis of current frames being encoded, said encoding including employing an encode bit rate for each stream of video frames to encode each stream of vide frames as groups of frames (GOPs);

during said encoding, analyzing each stream of video frames to derive information on at least one characteristic thereof, said at least one characteristic comprising at least one of an intraframe characteristic or an interframe characteristic;

dynamically adapting encoding of subsequent frames of at least one stream of video frames using relative information on the at least one characteristic obtained from each stream of video frames of the multiple streams of video frames, said dynamically adapting including for said at least one stream of video frames adjusting said encode bit rate employed in said encoding, wherein said encoding of said at least one stream of video frames is dynamically adaptive to relative changes in the at least one characteristic obtained from the multiple streams of video frames;

wherein said adjusting said encode bit rate for each stream of video frames only occurs upon beginning of a new group of frames (GOP); and wherein said single pass encoding comprises beginning a new GOP upon detection of a scene change within said stream of video frames, wherein for each stream of video frames said encode bit rate is constant within each GOP and is variable between GOPs.

16. The method of claim 15, wherein said analyzing comprises analyzing each stream of video frames to derive information on complexity of a scene being encoded, wherein said complexity of said scene comprises said at least one characteristic.

17. The method of claim 16, wherein said encoding produces multiple compressed video streams, and wherein said method further comprises multiplexing each compressed video stream onto a constant bit rate channel.

18. The method of claim 17, wherein said method further comprises buffering each compressed video stream prior to said multiplexing, and wherein said analyzing comprises analyzing each stream of video frames to derive statistics on said at least one characteristic thereof, said statistics comprising at least one of statistics on bits used, average MQUANT, buffer fullness, or scene change.

19. The method of claim 17, further comprising buffering said multiplexed compressed video streams in a channel buffer coupled to said constant bit rate channel, and wherein said dynamically adapting encoding includes for each stream of video frames modifying said encode bit rate based on fullness of said channel buffer.

20. The method of claim 19, further comprising determining a minimum buffer size for said channel buffer, said minimum buffer size being defined as:

$$B_s = 2 \cdot \Delta R_{max} \cdot tgop_{max},$$

wherein:

$\Delta R_{max} = \Sigma R_i - R_c$ $R_i$=calculated bit rate for stream i of video frames, $R_c$=channel bit rate, $tgop_{max}$=maximum GOP time.

21. The method of claim 15, wherein said at least one characteristic comprises for each stream of video frames complexity of video data comprising said stream of video frames, and wherein said analyzing comprises predicting complexity of a new scene based on complexity of a first frame of said new scene.

22. The method of claim 15, wherein said multiple streams of video frames comprise different sources of video data or a common source of video data divided into multiple streams.

23. A system for processing multiple streams of video frames:

multiple encoders for encoding in a single pass frames of said multiple streams of video frames in parallel without a priori statistical analysis of current frames being encoded, each encoder receiving one stream of video frames of said multiple streams of video frames;

a joint controller coupled to each encoder of said multiple encoders for dynamically adapting encoding of subsequent frames of at least one stream of video frames of the multiple streams of video frames based on relative complexity of the current video frames being encoded;

wherein said joint controller's dynamically adapting encoding comprises adjusting an encode bit rate employed in said single pass encoding to encode said subsequent frames of said at least one stream of video frames;

wherein said adjusting said encode bit rate for said at least one stream of video frames only occurs upon beginning of a new group of frames (GOP); and wherein said single pass encoding by said multiple encoders comprises beginning a new GOP upon detection of a scene change within said at least one stream of video frames, wherein for said at least one stream of video frames said encode bit rate is constant within each GOP and is variable between GOPs.

24. The system of claim 23, wherein said multiple encoders produce multiple compressed video streams, and wherein said system further comprises multiple buffers, each buffer being coupled to receive output from a corresponding encoder of said multiple encoders, and wherein said controller includes means for dynamically adapting encoding of said at least one stream of video frames based in part on fullness of a buffer of (of said multiple buffers) coupled to an encoder (of said multiple encoders) encoding said at least one stream of video frames.

25. The system of claim 24, further comprising a multiplexer for multiplexing said multiple compressed video streams for transfer onto a constant bit rate channel, and a channel buffer coupled between said multiplexer and said constant bit rate channel for ensuring delivery of multiplexed compressed video streams at said constant bit rate.

26. The system of claim 25, wherein said controller comprises means for adapting encoding of said at least one stream of video frames based on fullness of said channel buffer.

27. The system of claim 25, wherein the channel buffer size is greater than or equal to a minimum buffer size ($B_s$), said minimum buffer size being determined as:

$$B_s = 2 \cdot \Delta R_{max} \cdot tgop_{max},$$

wherein:

$\Delta R_{max} = \Sigma R_i - R_c$ $R_i$=calculated bit rate for stream i of video frames, $R_c$=channel bit rate, $tgop_{max}$=maximum GOP time.

28. The system of claim 23, wherein said multiple encoders comprise multiple MPEG encoders coupled in parallel, each MPEG encoder being connected to receive one stream of video frames of said multiple streams of video frames, wherein said multiple streams of video frames comprise different sources of video data or a common source of video data divided into multiple streams.

29. A system for processing multiple streams of video frames comprising:

multiple encoders for encoding in a single pass frames of multiple streams of video frames in parallel without a priori statistical analysis of current frames being encoded, each encoder employing an encode bit rate for encoding one stream of video frames as groups of frames (GOPs);

means for analyzing each stream of video frames to derive information on at least one characteristic thereof, said at least one characteristic comprising at least one of an intraframe characteristic or an interframe characteristic;

means for dynamically adapting encoding of subsequent frames of at least one stream of video frames using relative information on the at least one characteristic obtained from each stream of video frames of the multiple streams of video frames, said means for dynamically adapting including for said at least one stream of video frames means for adjusting said encode bit rate employed in said encoding, wherein said encoding of said at least one stream of video frames is dynamically adaptive to relative changes in the at least one characteristic obtained from the multiple streams of video frames;

wherein said means for adjusting said encode bit rate for each stream of video frames comprises means for adjusting said encode bit rate for each stream of video frames only upon beginning of a new group of frames (GOP); and wherein said single pass encoding of said multiple encoders comprises beginning a new GOP upon detection of a scene change within said stream of video frames, wherein for each stream of video frames said encode bit rate is constant within each GOP and is variable between GOPs.

30. The system of claim 29, wherein said means for analyzing comprises means for analyzing each stream of video frames to derive information on complexity of a scene being encoded, wherein said complexity of said scene comprises said at least one characteristic.

31. The system of claim 30, wherein said multiple encoders produce multiple compressed video streams, and wherein said system further comprises a multiplexer for multiplexing said compressed video streams for transfer onto a constant bit rate channel.

32. The system of claim 31, further comprising multiple buffers, each buffer of said multiple buffers being coupled between one encoder of said multiple encoders and said multiplexer, and further comprising a channel buffer, said channel buffer being coupled between said multiplexer and said constant bit rate channel, and wherein said means for analyzing comprises means for analyzing each stream of video frames to derive statistics on at least one characteristic thereof, said statistics comprising at least one of statistics on bits used, average MQUANT, buffer fullness, or scene change.

33. The system of claim 32, wherein the channel buffer size is greater than or equal to a minimum buffer size ($B_s$), said minimum buffer size being determined as:

$$B_s = 2 \cdot \Delta R_{max} \cdot tgop_{max},$$

wherein:

$\Delta R_{max} = \Sigma R_i - R_c$ $R_i$=calculated bit rate for stream i of video frames, $R_c$=channel bit rate, $tgop_{max}$=maximum GOP time.

34. The system of claim 29, wherein said at least one characteristic comprises for each stream of video frames complexity of video data comprising said stream of video frames, and wherein said means for analyzing comprises means for predicting complexity of a new scene based on complexity of a first frame of said new scene.

35. An article of manufacture, comprising:

at least one computer usable medium having computer readable program code means embodied therein for causing the processing of multiple streams of video frames, the computer readable program code means in said article of manufacture comprising:

computer readable program code means for causing a computer to encode in a single pass frames of said multiple streams of video frames without a priori statistical analysis of current frames being encoded;

computer readable program code means for causing a computer to dynamically adapt encoding of subsequent frames of at least one stream of video frames of said multiple streams of video frames based on relative complexity of the current video frames being encoded;

wherein said dynamically adapting encoding comprises adjusting an encode bit rate employed by said single pass encoding to encode said subsequent frames of said at least one stream of video frames;

wherein said adjusting said encode bit rate for said at least one stream of video frames only occurs upon beginning of a new group of frames (GOP); and wherein said single pass encoding comprises beginning a new GOP upon detection of a scene change within said at least one stream of video frames, wherein for said at least one stream of video frames said encode bit rate is constant within each GOP and is variable between GOPs.

36. The article of manufacture of claim 35, wherein said computer readable program code means for causing a computer to dynamically adapt encoding includes computer readable program code means for causing a computer to dynamically adapt encoding of the at least one stream of video frames using feedback on fullness of a buffer coupled to receive compressed video stream output from said encoding.

37. The article of manufacture of claim 35, wherein said computer readable program code means for causing a computer to encode comprises computer readable program code means for causing a computer to encode said multiple streams of video frames in parallel to produce multiple compressed video streams, and wherein said article of manufacture further comprises computer readable program code means for causing a computer to multiplex said multiple compressed video streams for transfer onto a constant bit rate channel.

38. The article of manufacture of claim 37, further comprising computer readable program code means for causing a computer to buffer the multiplexed compressed video streams in a channel buffer coupled to said constant bit rate channel, and wherein said dynamically adapting encoding includes for each stream of video frames modifying said encode bit rate based on fullness of said channel buffer.

39. The article of manufacture of claim 38, further comprising computer readable program code means for causing a computer to determine a minimum buffer size ($B_s$) for said channel buffer coupled to said constant bit rate channel, said minimum buffer size being determined as:

$$B_s = 2 \cdot \Delta R_{max} \cdot tgop_{max},$$

wherein:

$\Delta R_{max} = \Sigma R_i - R_c$ $R_i$=calculated bit rate for stream i of video frames, $R_c$=channel bit rate, $tgop_{max}$=maximum GOP time.

40. An article of manufacture, comprising:

at least one computer usable medium having computer readable program code means embodied therein for causing the processing of multiple streams of video frames, the computer readable program code means in said article of manufacture comprising:

computer readable program code means for causing a computer to encode in a single pass frames of said multiple streams of video frames in parallel without a priori statistical analysis of current frames being encoded, said single pass encoding including employing an encode bit rate for each stream of video frames to encode each stream of video frames as groups of frames (GOPs);

computer readable program code means for causing a computer to analyze each stream of video frames to derive information on at least characteristic thereof, the at least one characteristic comprising at least one of an intraframe characteristic or an interframe characteristic;

computer readable program code means for causing a computer to dynamically adapt encoding subsequent frames of at least one stream of video frames using relative information on the at least one characteristic obtained from each stream of video frames of the multiple streams of video frames, said dynamically adapting including for said at least one stream of video frames adjusting said encode bit rate employed in said encoding, wherein said encoding of said at least one stream of video frames is dynamically adaptive to relative changes in the at least one characteristic obtained from the multiple streams of video frames;

wherein said adjusting said encode bit rate for each stream of video frames occurs upon beginning of a new group of frames (GOP); and wherein said single pass encoding comprises beginning a new GOP upon detection of a scene change within said stream of video frames, wherein for each stream of video frames said encode bit rate is constant within each GOP and is variable between GOPs.

41. The article of manufacture of claim 40, wherein said computer readable program code means for causing a computer to dynamically adapt said encoding comprises computer readable program code means for causing a computer to analyze each stream of video frames to derive information on complexity of a scene being encoded, wherein said complexity of said scene comprises said at least one characteristic.

42. The article of manufacture of claim 40, further comprising for each stream of video frames computer readable program code means for causing a computer to initiate a new group of frames upon detection of a scene change within said stream of video frames, and wherein said at least one characteristic comprises complexity of video frames of each stream of video frames, and wherein said computer readable program code means for causing a computer to analyze comprises computer readable program code means for causing a computer to predict complexity of a new scene based on complexity of a first frame of said new scene.

43. The article of manufacture of claim 40, wherein said computer readable program code means for causing a computer to encode comprises computer readable program code means for causing a computer to multiplex said multiple compressed video streams for transfer onto a constant bit rate channel, and to buffer said multiplexed compressed video streams in a channel buffer coupled to said constant bit rate channel.

44. The article of manufacture of claim 43, further comprising computer readable program code means for causing a computer to define a minimum buffer size ($B_s$) of said channel buffer as:

$$B_s = 2 \cdot \Delta R_{max} \cdot tgop_{max},$$

wherein:

$\Delta R_{max} = \Sigma R_i - R_c$ $R_i$=calculated bit rate for stream i of video frames, $R_c$=channel bit rate, $tgop_{max}$=maximum GOP time.

* * * * *

UNITED STATES PATENT AND TRADEMARK OFFICE
CERTIFICATE OF CORRECTION

PATENT NO.    : 6,956,901 B2
DATED         : October 18, 2005
INVENTOR(S)   : Boroczky et al.

It is certified that error appears in the above-identified patent and that said Letters Patent is hereby corrected as shown below:

<u>Title page,</u>
Item [75], Inventors, delete "Edward F. Westermann, Endwell, NY (US)" and insert -- Edward F. Westermann, Endicott, NY (US) --.

<u>Column 18,</u>
Line 45, delete the word "vide" and insert -- video -- in the second instance.

Signed and Sealed this

Thirteenth Day of December, 2005

JON W. DUDAS
*Director of the United States Patent and Trademark Office*